United States Patent [19]

Zucker et al.

[11] Patent Number: 5,394,415
[45] Date of Patent: Feb. 28, 1995

[54] METHOD AND APPARATUS FOR MODULATING OPTICAL ENERGY USING LIGHT ACTIVATED SEMICONDUCTOR SWITCHES

[75] Inventors: Oved S. F. Zucker, DelMar; Iain A. McIntyre, Vista; Paul J. Solone, Cardiff-by-the-Sea; David Giorgi, Encintas, all of Calif.

[73] Assignee: Energy Compression Research Corporation, San Diego, Calif.

[21] Appl. No.: 184,010

[22] Filed: Jan. 21, 1994

Related U.S. Application Data

[63] Continuation-in-part of Ser. No. 985,144, Dec. 3, 1992.

[51] Int. Cl.$^6$ .................................................. H01S 3/10
[52] U.S. Cl. ............................................. 372/26; 372/38;
372/27; 372/92; 372/10; 372/101; 372/18;
372/21; 372/82
[58] Field of Search ............................ 372/26, 27, 38, 10,
372/21, 92, 18, 101, 82

[56] References Cited

U.S. PATENT DOCUMENTS

| | | | |
|---|---|---|---|
| 3,917,943 | 11/1975 | Auston | 250/211 |
| 4,509,829 | 4/1985 | Peterson | 372/26 |
| 4,752,931 | 6/1988 | Dutcher et al. | 372/18 |
| 4,841,528 | 6/1989 | Sipes, Jr. et al. | 372/22 |
| 4,965,803 | 10/1990 | Esterowitz et al. | 372/5 |
| 5,001,716 | 3/1991 | Johnson et al. | 372/10 |

OTHER PUBLICATIONS

GHC New, Optics Sec., Dept. Phys., Imperial Col. of Science & Tech., "The generation of ultrashort laser pulses", Rep. Prog. Phys., vol. 46, 1983, pp. 877–879.

R. B. Chesler & D. Maydan, "Calculation of ND:YA1G Cavity Dumping, Journal of Applied Physics", vol. 42, No. 3, Mar. 1, 1971, pp. 1028–1030.

Adelbert Owyoung, et al., "Gain switching of a monolithic single-frequency laser-diode-excited Nd:YAG laser", Optics Letters, vol. 10, No. 10, Oct. 1985, pp. 484–486.

Arthur A. Vuylsteke, "Theory of Laser Regeneration Switching", Journal of Applied Physics, vol. 34, No. 6, Jun. 1963, pp. 1615–1622.

I. P. Alcock and A. I. Ferguson, "Mode-Locking And Q-Switching Of An Optically Pumped Miniature Nd$^{3+}$:YAG Laser", Optics Communications, vol. 58, No. 6, pp. 417–419 15 Jul. 1986.

Amado Cordova-Plaza, et al., "Miniature CW and Active Internally Q-Switched ND:MgO:LiNbO$_3$ Lasers", IEEE Journal of Quantum Electronics, vol. QE-23, No. 2, Feb. 1987, pp. 262–266.

D. H. Auston, "Picosecond optoelectronic switching and gating in silicon", Appl. Phys. Lett., vol. 20, No. 3, Feb. 1, 1975, pp. 101–103.

(List continued on next page.)

Primary Examiner—Léon Scott, Jr.
Attorney, Agent, or Firm—Marks & Murase

[57] ABSTRACT

The optical modulator of the invention comprises an electro-optic material (EOD) which modulates optical energy in accordance with an applied voltage. The applied voltage is controlled by a light activated switch, or switches, which vary the magnitude of the voltage applied by switching a charge transfer circuit (or other dc source) of which the EOD forms a capacitive element. The charge transfer circuit preferably includes a plurality of capacitive elements, each charged to a separate voltage, so that when switched by said light activated switches, the voltage applied to the EOD is controlled. When used in a laser cavity, the optical modulator can control the output of the laser in response to optical input signals. The optical modulator may be used for Q-switching the laser cavity, mode-locking the laser, cavity dumping the laser or modulating the output of the laser, or a combination of the above. The optical input control signal may comprise light from within the laser cavity, from the output of the laser cavity, or from a source external to the laser cavity. The optical modulator may modulate a plurality of beams of optical energy based upon a single applied voltage or it may modulate the plurality of beams in accordance with a respective plurality of applied voltage levels.

163 Claims, 23 Drawing Sheets

OTHER PUBLICATIONS

Jean-Marc Heritier and Dave Scerbak, "Electro-Optically Q-Switched, Diode Laser-Pumped Solid-State Laser for Short Pulse Generation", Jt. Project: Quantel Intl., Inc. & Electro-Optics Tech., Inc., Proceedings of Conference In Lasers and Electro-Optics (CLEO) (1989) (19 pages).

W. Sibbett Margulus and J. R. Taylor, "Active Mode-Locking of Lasers Using GaAs and GaP Picosecond Switches", Optics Communications, vol. 35, No. 1, Oct. 1980, pp. 153–156.

P. LeFur and D. H. Auston, "A kilovolt picosecond optoelectronic switch and Pockel's cell", (1975) (3 pages).

G. Mourou and W. Knox, "High-power switching with picosecond precision", Appl. Phys. Lett. vol. 35, No. 7, Oct. 1, 1979, pp. 492–494.

J. Agostinelli, et al., "Active pulse shaping in the picosecond domain", Appl. Phys. Lett., vol. 35, No. 10, Nov. 15, 1979, pp. 731–734.

Chen Shaohe, et al., "A Novel Mode-Selecting and Q-Switching Technique", IEE Journal of Quantum Elec., vol. 28, No. 11, Nov. 1992, pp. 2556–2559.

C. J. Norrie, et al., "Single-Frequency Operation of Diode-Laser-Array Transverse-Pumped Q-Switched ND:YAG Laser", Electronics Letters, vol. 25, No. 17, (1989–1990), pp. 1115 and 1116.

R. W. Hellwarth, "Control of Fluorescent Pulsations", from Advances In Electronics, Col. U. Press (1961).

Tso Yee Fan and Robert L. Byer, "Diode Laser-Pumped Solid-State Lasers", IEE Journ. of Quantum Elec., vol. 24, No. 6, Jun. 1988, pp. 895–912.

METHOD AND APPARATUS FOR MODULATING OPTICAL ENERGY USING LIGHT ACTIVATED SEMICONDUCTOR SWITCHES

This is a continuation-in-part of application Ser. No. 07/985,144, filed Dec. 3, 1992, now pending in Group 2500.

BACKGROUND OF THE INVENTION

1. Field Of The Invention

The present invention generally relates to an apparatus and method for modulating optical energy and, more particularly, to an apparatus and method for controlling the optical energy, e.g. within a laser cavity by using and controlling dc voltages by means of light activated switches. The present invention further relates to a control system and method for controlling a laser system to enable the system to perform Q-switching, mode-locking and/or cavity dumping. The present invention also relates to an apparatus for the production of short laser radiation pulses using cavity dumping techniques. The present invention also relates to methods of Q-switching a laser system at speeds on the order of about a few hundred picoseconds.

2. Description Of The Prior Art

Optical modulators, used, for example, to control the output of lasers, are generally controlled by electrical signals. The limitation on the application of an electrical signal to a modulator in terms of speed, multiple pulse switching, volume, etc., have a direct consequence on the performance of laser systems. The present invention can be employed in lasers to generate optical pulse of large power (e.g. multi-megawatt) which have an extremely short duration. This is a regime of operation which has not previously been addressed by laser systems. The present invention provides for Q-switching a laser system at speeds on the order of about a few hundred picoseconds, a new capability requirement which has arisen with the introduction of solid state lasers having an optical length in the millimeter range. The present invention also enables mode-locking and cavity dumping, resulting in the generation of optical pulses in the picosecond regime.

Several methods have been developed for producing pulses from lasers in a controlled manner, including Q-switching, mode-locking cavity dumping, gain switching, self-injection and various combinations of these methods.

Conventional optically pumped solid state lasers (i.e. lasers based on an active medium comprised of active ions contained in a crystalline lattice, e.g. ruby, neodymium:yttrium aluminum garnet, etc.) produce pulses through one of several processes. As described by R. W. Hellwarth ("Advances in Quantum Electronics," 1961) Q-switching involves raising the cavity Q from low to high when there is a maximum population inversion in the active medium. This produces a pulse having a typical duration of a few round-trip transit times of the laser cavity. Mode-locking, where several longitudinal cavity modes are locked together in phase, creating a temporal interference such that the laser produces pulses at a rate equal to the inverse of the round-trip transit time of the laser cavity, and with a duration of some small fraction of the cavity round-trip transit time, is described by G. H. C. New, "The Generation of Ultrashort Pulses," Rep Prog Phys. 46 877 (1983). Cavity dumping, where the cavity Q is decreased from a high value, (i.e., where the circulating optical power is high) to a low value (i.e., where the circulating optical power can quickly escape from the laser cavity) is described by R. B. Chesler, et al., J. Appl. Phys. 42 1028 (1971). If the laser is not mode-locked, the pulse lengths produced in this method can be as short as the laser cavity round-trip transit time and, if the laser is mode-locked, considerably shorter.

Gain switching is described by A. Owyoung, et al., "Gain Switching of a Monolithic Single Frequency Laser-Diode-Excited Nd:YAG Laser," Optics Lett 10 484 (1985), in which the gain of the laser is quickly increased to a high level through pulsed pumping. The intracavity radiation level quickly builds up to saturate the gain in the laser and then escapes. Typical pulse lengths can be a few laser cavity round-trip transit times.

"Self-injection" or "cavity-flipping" is a known technique which involves the use of a polarization modulator for "flipping" the polarization of the intracavity radiation in a laser in order to generate a pulse whose duration is less than the cavity round trip time, as described by C. H. Brito-Cruz, et al., "The Self-Injected Nonmode-locked Picosecond Laser," IEEE Journal Quant Electron QE-19 573, (1983). This pulse is then regeneratively amplified before being dumped out. During the amplification process, pulse shortening techniques may be applied to reduce the pulse from the nanosecond regime to the picosecond regime.

A technique known as pulse transmission mode ("PTM"), where the cavity Q is kept low to build up a large gain in the active medium and is then switched high to transfer the stored energy into the optical field, is described by A. A. Vuylsteke, "Theory of Laser Regeneration Switching, J. Appl. Phys. 34 1615 (1963). At the point of maximum optical field, the cavity Q is reduced to a low value to allow the optical energy to escape quickly. This technique can be viewed as a combination of Q-switching and cavity dumping.

Microchip lasers, such as that described by A. Mooradian in U.S. Pat. No. 4,860,304, can be operated in a Q-switched mode, as described by J. J. Zayhowski and A. Mooradian in U.S. Pat. No. 5,132,977, which results in the generation of pulses shorter than 300 ps in duration. These Q-switched pulses are considerably shorter than those produced by conventional Q-switched lasers due to their extremely short cavity length, which is on the order of about 1 mm. However, the energy output from this type of laser is severely restricted due to the small volume of active material employed. The short Q-switching build up time in the microchip laser requires that the Q-switch activation be extremely fast; this can be achieved using the fast switching described in this invention. Shorter pulses than can be generated using Q-switching alone can be produced using the feedback Q-switch/cavity dumping technique described herein. This will allow the generation of pulses in the sub 100 ps range, a pulse duration range which heretofore has only been accessible using the technique of mode-locking.

Operation of arrays of microchip lasers, described by A. Mooradian in U.S. Pat. No. 5,115,445, will result in an increase of the total pulse energy to the level of a few millijoules. The present invention will enable many millijoules to be generated in the subnanosecond regime.

Conventionally, electro-optic modulators have been used in systems to control optical beams in applications such as signal modulation for optical communication and in the control of solid state lasers. When controlling solid state lasers, electro-optic modulators have been used in systems which enable Q-switching, cavity dumping, or mode-locking of the lasing system. Present electro-optic modulators, however, must be configured for each application; e.g., Q-switching, cavity dumping, or mode-locking. To perform each different application, the configuration of the modulator and its associated system must be altered.

The most common form of intracavity electro-optic modulation is Q-switching with a system that uses, for example, a Pockels cell. In a pulse reflection mode, i.e. normal Q-switching, the Pockels cell is used to change the cavity Q once during a pulse sequence. Other applications using a Pockels cell may also require the voltage applied to the Pockels cell to be turned on and off. These other applications include PTM operation, pulse slicing, optical gating, and single pulse selection. An advantage of PTM (cavity dumped) operation is that the duration of the optical pulse is limited by the cavity length, whereas the duration of a Q-switched pulse is determined by the gain characteristics and cavity decay time. Various approaches have been employed to provide turn-on and turn-off capabilities using a Pockels cell, including the use of two krytrons or a microwave tube. These approaches, however, are limited as to risetime, repetition rate and lifetime, or require complicated switched power supplies.

As disclosed in U.S. Pat. No. 3,917,943 to Auston, it is recognized that a photoconductive switch is a relatively fast, electrical switching device. The use of a photoconductive switch to control a Pockels cell to achieve a risetime of 25 ps was disclosed by LeFur, et al. in Appl. Phys. Lett. 28 21 (1976), and further detailed in Mourou and Knox, Appl. Phys. Lett 35 492 (1979) and Agoibaelli, et al., Appl. Phys. Lett 35 731 (1979).

Margulis, et al. in Optics Comm. 35 153 (1980) disclosed a photoconductive switch controlling a Pockels cell to actively mode-lock a coumarin dye laser. The signal for controlling a GaAs photoconductive switch was obtained from a second mode-locked laser. The short carrier lifetime of 100 ps allowed the Pockels cell to recover during the 5 ns round-trip transit time. Another application of photoconductive switch control discussed by M. J. P. Payne and M. W. Evans, Paper TUB16, Proceedings of Confr. on Lasers & Optics, 1984 Anaheim, Calif., was the use of negative feedback to extend the pulse length of a Q-switched Nd:YAG laser. In this case, 10% of the intracavity radiation was extracted via a beam splitter to activate a photoconductive switch, which controlled the Pockels cell voltage.

In these earlier inventions and disclosures, the essence of using a photoconducting switch was to use the fast switching speed to discharge a charged transmission line into a second, impedance matched line which contained the electro-optic modulator. This configuration is recognized as providing the fastest possible electrical risetime on the modulator.

Use of a Pockels cell as a phase retarding element in a tunable Q-switched laser is known from U.S. Pat. No. 5,001,716. Also, a Q-switched solid-state laser structure is known from U.S. Pat. No. 4,965,803. A cavity-dumped laser using feedback is known from U.S. Pat. No. 4,841,528. Finally, the use of a pulser for pulsing a Q-switch within a laser cavity is known from U.S. Pat. No. 4,752,931.

SUMMARY OF THE INVENTION

It is an object of the present invention to provide an apparatus and method for modulating optical energy in accordance with at least one optical control signal.

It is a further object of the present invention to provide an optical-to-optical modulator and method for varying the modulated output in accordance with at least one dc voltage source.

It is another object of the present invention to provide a lasing system having an optical-to-optical modulator for controlling the laser cavity in accordance with optical energy from within and/or external to the laser cavity.

It is yet a further object of the present invention to provide a lasing system and method using an optical-to-optical modulator to produce a combination of one or more of Q-switching, mode-locking and/or cavity dumping operations to control the optical energy within a laser cavity.

It is a still further object of the invention to provide a lasing system and method for generating high power laser pulses of short (e.g. subnanosecond) duration.

It is yet a further object of the invention to provide a method and apparatus for producing an output pulse from a laser system, where the pulse characteristics (e.g. amplitude, width, modulation, etc.) can all be varied based on arbitrary, selectable control of the laser cavity.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objectives, in accordance with the present invention, as embodied and broadly described herein, the optical-to-optical modulator of the inventor comprises an electro-optic material operable to modulate optical energy in accordance with applied voltages. The applied voltages are preferably controlled by activating at least one, and preferably two or more, light activated semiconductor switches using one or more optical input control signals. Preferably, the applied voltages are controlled using a charge transfer circuit controlled by the light activated semiconductor switch or switches. The charge transfer circuit may preferably comprise one or more capacitive elements.

In another embodiment of the invention, a lasing system including an optical-to-optical modulator for selectively controlling the output of the lasing system is provided. When used within the lasing system, the optical-to-optical modulator may be selectively controlled in order to perform one or more of the following: Q-switching the laser cavity, mode-locking the laser cavity, cavity dumping the laser cavity, or modulating the output of the laser cavity. The optical-to-optical modulator may be controlled using at least one optical input control signal for controlling a voltage applied to the optical modulator. The voltage is preferably derived from one or more charged capacitive elements.

The modulator may be used to modulate any one or more of various characteristics of the optical energy passing therethrough, such as the amplitude, phase or polarization of the optical energy.

In yet another embodiment of the invention, a laser system having a laser medium disposed within a lasing cavity having a lasing axis along which optical energy is emitted is provided. The system includes a modulator, which is responsive to an applied control voltage for modulating a characteristic of the optical energy passing therethrough and which is disposed along the lasing axis of the lasing system. A control means for controlling the applied control voltage is also provided, the control means including at least one light activated switch operating in the charge transfer mode, and responsive to an optical input control signal for varying the applied control voltage, whereby the optical energy output from said laser system is modulated in accordance with the applied optical input control signal and the resulting applied control voltage.

A method of controlling an optical-to-optical modulator, wherein the modulator includes at least one capacitive voltage storage element formed from an electro-optic material and responsive to an applied control voltage to modulate optical energy passing therethrough, and at least one light activated switch operating in the charge transfer mode and responsive to an optical input control signal is also provided. The method comprises the steps of passing optical energy through the electro-optic material while controlling the applied control voltage across the modulator by means of the optical input control signal in order to selectively vary said applied control voltage. In this way, the optical energy passing through the electro-optic material is modulated in accordance with the applied control voltage. The light activated switch may include a switch connected in shunt across the electro-optic material capacitive voltage storing element, whereby the applied control voltage across the modulator is charged by means of controlling the action of the shunting switch. Alternatively, or in addition, the light activated switch may include a switch connected in series between the electro-optic material capacitive voltage storage element and a further capacitive voltage storage element. This switch may be made responsive to another optical control signal, whereby the applied control voltage on the modulator may be changed (or further changed) by means of controlling the transfer of charge between the capacitive voltage storage elements using the series connected switch and its associated optical control signal.

BRIEF DESCRIPTION OF THE DRAWINGS

The accompanying drawings, which are incorporated in and form a part of the specification, illustrate embodiments of the present invention and, together with the description, serve to explain the principles of the invention. Similar devices depicted in the various drawings are labeled using similar reference numerals. In the drawings.

DETAILED DESCRIPTION OF THE PREFERRED EMBODIMENTS

Figure 1A:
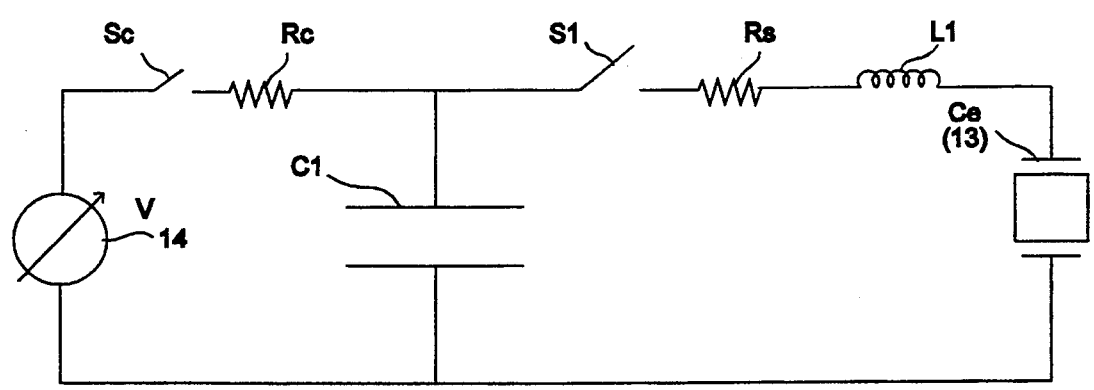
FIGS. 1(a), 1(b), 1(c), 1(d), 1(e) and 1(f) are schematic representations of electrical circuits employed in different embodiments of an optical-to-optical modulator.

Reference will now be made in detail to the presently preferred embodiments of the invention, examples of which are illustrated in the accompanying drawings.

Like the optical-to-optical modulator described in the copending, commonly assigned application Ser. No. 07/985,144, an important feature of the invention is that the optical-to-optical modulator be controllable to perform a variety of functions, both without and within a laser as a cavity device. For the purposes of describing the present invention, an optical-to-optical modulator will be defined as a device including or containing an electro-optic material which alters the state of a light beam passing through it. The alteration in state may be in amplitude, phase, polarization, or some other variable. The change in state is accomplished by applying an electric field to the electro-optic device (EOD). The EOD may take various forms, such as a Pockels cell, phase modulator, electro-optic beam deflector, electro-optic lens, etc. The type of modulation imposed on the optical beam, e.g., amplitude, phase or polarization, is dependent on the choice of electro-optic element chosen for the modulator which, in general, is not related to the method used for applying the electric field. In other words, the characteristic of the optical beam to be modulated can be selected based on the electro-optic element chosen.

As will be appreciated by the artisan, the EOD has an associated capacitance formed by the electrodes on the EOD and the material between the electrodes; the value of this capacitance is dependent on material and geometrical properties of the EOD and is generally referred to hereinafter as $C_e$. In accordance with the present invention, the optical-to-optical modulator is selectively controlled using optical input control signals and associated light activated switches to control the charge on the EOD as well as various voltage sources to which the EOD may be selectively connected whereby the optical energy passing through the modulator may be selectively controlled as desired. In other words, a system using the invention can be considered as a three-port device having a high energy output port (for outputting modulated optical energy), a low-energy control port (i.e., the optical input control signal(s)), and a power supply port for supplying the optical energy to be modulated (i.e., one or more laser beams).

In accordance with one aspect of the present invention, a light activated semiconductor switch is used to transfer charge between a storage capacitor and the EOD or simply away from the EOD at a predetermined point in time. When transferring charge away from the EOD, it may be transferred to another capacitive element, to a load, or to ground. Basically, the dc condition of the EOD is controlled from one dc condition to a second dc condition, and subsequently to a third condition, a fourth condition and so on as desired, in order to change its electric field and thereby modulate the optical energy passing through it. In general, the electric field across the EOD may be changed either by adding or removing electrical charge from it. These two basic types of switching action can be performed using light activated switches.

When adding voltage across the EOD (i.e., increasing the charge), a light activated switch can be used to connect the EOD to a voltage source, e.g. a charged capacitor. When subtracting voltage from across the EOD (i.e., removing charge), the light activated switch can be used to connect the EOD to, for example, a further capacitor, a dissipative load, or to ground.

A first example of a preferred embodiment of the invention which is usually used for adding voltage to an EOD is shown in FIG. 1(a). The circuit of FIG. 1(a) includes a single photoconductive switch, $S_1$ for transferring from a storage capacitor, C1 whose value of capacitance may be designated as C1. The circuit further includes a resistance $R_s$ which is a lumped resistance, representative of the resistances associated with the switch $S_1$ and the external circuit resistance. The circuit further includes an inductance, 12, which is typically an inductance associated with the geometry of the circuit and the switch, whose lumped value is designated as L1, and an EOD 13. When the switch $S_c$ is closed, the capacitor C1 is charged to an initial voltage $V_i$ by a voltage source, 14, preferably a variable voltage source, via a charging resistance $R_c$. In the typical case where it is desirable to isolate the voltage source 14 from the rest of the circuit, the value of $R_c$ should be chosen so that the capacitor charging time constant $R_c$·C1 is long relative to the switching operation of the EOD. If the charging time constant is small, then the switch $S_c$ should be opened when closing the switch $S_1$ if isolation of the voltage source 14 is desired. Assuming the voltage source 14 is actually isolated (via switch $S_c$) from the circuit or virtually isolated because of the time constants involved, then its only function is to provide the charge for capacitor C1. For simplicity, the voltage source and its associated switch $S_c$ is omitted from the figures which follow.

The circuit of FIG. 1(a) may be used to transfer electrical charge between the capacitor C1 and the EOD, 13. In this straightforward circuit, the equilibrium voltage $V_f$ appearing across the EOD 13 after the switch $S_1$ is closed may be calculated, considering the conservation of charge rule, by using the expression:

$$V_f = V_i \frac{C1}{C1 + C_e} \quad (1)$$

where $V_i$ is the initial voltage on the capacitor C1 prior to switching and $C_e$ is the capacitance of the EOD. As should now be understood, unlike applicants' copending application Ser. No. 07/985,144 where a light activated semiconductor (LASS) switch is used to control an EOD (typically a Pockels cell) by generating a travelling voltage wave on a transmission line, the light activated switches in the present invention are used, as explained above, to change the EOD from one dc condition to another.

The light activated switch or switches $S_1$ (as well as the other light activated switches discussed hereinbelow) may have linear or non-linear photoconductive characteristics. Light activated switches having non-linear characteristics include avalanche and lock-on devices. Also, the light activated switch(es) may take the form of an intrinsic block of semiconducting materials (a so-called bulk device) or it may be a junction device. In accordance with the present invention, junction devices are preferred. Such junction device may comprise devices having a single junction (e.g., a diode) and devices having a plurality of junctions, e.g., a transistor). Also, in those applications where fast switching is important, linear switches, where a carrier pair is created from the absorption of each photon, are preferred. Non-linear switches, such as avalanche or lock-on switches, are not recommended for fast switching.

The light activated switches may be comprised of any suitable material. For example, the material may be comprised of any of the elemental semiconducting materials, such as silicon (Si), diamond (C), or germanium (Ge); the group IV semiconducting compounds, such as silicon carbide (SIC), the group III–V semiconducting compounds and alloys, including, but not limited to, gallium arsenide (GaAs), aluminum gallium arsenide (AlGaAs), indium phosphide (InP), and indium arsenic phosphide (InAsP); and the II–VI semiconducting compounds and alloys, including, but not limited to, zinc selenide (ZnSe), zinc sulfide (ZnS), mercury cadmium telluride (HgCdTe) and lead tin selenide (PbSnTe).

In exemplary embodiment of FIG. 1(a), the nature of the voltage transient which occurs in moving from the initial dc electrical condition to the equilibrium dc electrical condition has not yet been described. All components, particularly the switch $S_1$ (and the Switch $S_s$ described below in connection with FIG. 1(b)), have some electrical resistance, and the equilibrium voltage is reached via a damped oscillation. The degree of damping; i.e., whether overdamped, critically damped or underdamped, depends primarily on the resistance of the light activated switch $S_1$ after activation and the resistance of the circuit, as represented in FIG. 1(a) by $R_s$. This is also true in the cases of the circuits comprising FIGS. 1(b) to 1(f) and FIGS. 10-12 as discussed below where a capacitor is connected via a light activated switch to another capacitor or to an EOD. Since $R_s$ does not determine the final equilibrium voltage on the EOD, but only the transients involved, R, (as well as other switch associated resistances) are omitted from the figures which follow.

As can be ascertained from expression (1) above, the value, $L_1$, of the inductance 12 does not affect the final voltage achieved in the charge transfer process. It does, however, affect the speed of the voltage transient which occurs when switching from the initial to the final states. However, since the inductance is not of primary importance in the charge transfer process, it is omitted from the figures which follow.

In accordance with the present invention, the impedances associated with the storage capacitor C1 and the EOD 13 are not matched and therefore one does not obtain a travelling wave voltage. However, the impedance Z1, associated with the capacitor C1 is preferably chosen to be small, which results in a small associated time constant, $\tau 1$ ($\tau 1 = C1 \cdot Z1$). Thus, despite the lack of impedance matching, assuming that the circuit inductance is small and that the electrical circuit can be made to be physically small (for example, by using integrated circuit techniques to form the storage capacitor from a single layer dielectric film or other low inductance design), the voltage levels can be changed from one dc equilibrium to another in a very short time.

Although this method does not have the same inherent speed as that of the travelling wave approach discussed in copending application Ser. No. 07/985,144, it does have advantages in that the equilibrium voltage levels may be reached in a time short compared to the time frame of interest and in that the voltage levels may be maintained indefinitely using an electrical circuit which is small in volume. Using the travelling wave approach of copending Ser. No. 07/985,144, the electrical pulse is generated by a length of transmission line whose length is equal to one half the physical length of the electrical pulse. For a voltage pulse more than a few nanoseconds in duration, the transmission line tends to become increasingly larger; a complication not associated with the present invention.

As would be apparent to the artisan, a resistance placed in parallel with the EOD 13 of FIG. 1(a), would serve to drain the charge from the EOD at a rate dependent on the value of the resistance. For values of resistance sufficiently high that the rate of charge drainage is slow compared to the time frames of interest (the rate is inversely proportional to the product $R_d \cdot C_e$, where $R_d$ is the value of the drainage resistor), this drainage resistor will not affect the charge transfer process, but will allow the circuit to be reset for repeated operation.

As should now be apparent to the artisan, a variation in the value of voltage applied to the EOD will result in a change in the modulation applied to the light propagating through the EOD. For instance, reducing the voltage applied to the EOD on successive shots, e.g., by varying the value of voltage applied to C1, would result in a change in the polarization rotation, phase retardation, beam deflection, etc., depending on the nature of the EOD. By way of illustration, if the EOD were a Pockels cell, a reduction in voltage would change the wavelength at which half-wave retardation takes place. The charge applied to capacitor C1 may be controlled by charging via a selected one of a number of fixed voltage sources (not illustrated) or by connecting it to the switched variable voltage source 14.

Figure 1B:
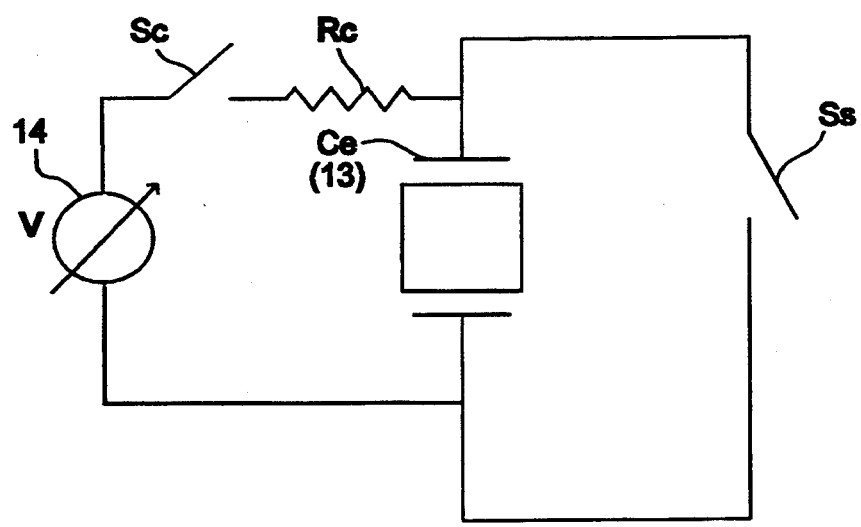

A second aspect of the invention, that of removing voltage from an EOD 13 is as illustrated in FIG. 1(b). In this case, the EOD capacitive element 13 has been charged to an initial dc voltage level, $V_i$, by an external circuit (not shown). Closure of the shorting light activated switch $S_s$ results in the removal of the initial voltage $V_i$ from the EOD and consequently in a change of the dc condition of the EOD.

Other standard circuit elements, such as resistors and capacitors, may be added to the circuits shown in FIGS. 1(a) and 1(b) so that the equilibrium voltage across the EOD is not zero, but some value determined by the values of the capacitive and resistive elements added. This is particularly useful if, for instance, the EOD is piezo-optic in nature and reduction of the applied external voltage to zero, e.g. using the circuit of FIG. 1(b), does not result in complete cancellation of the electro-optic effect.

Figure 1C:
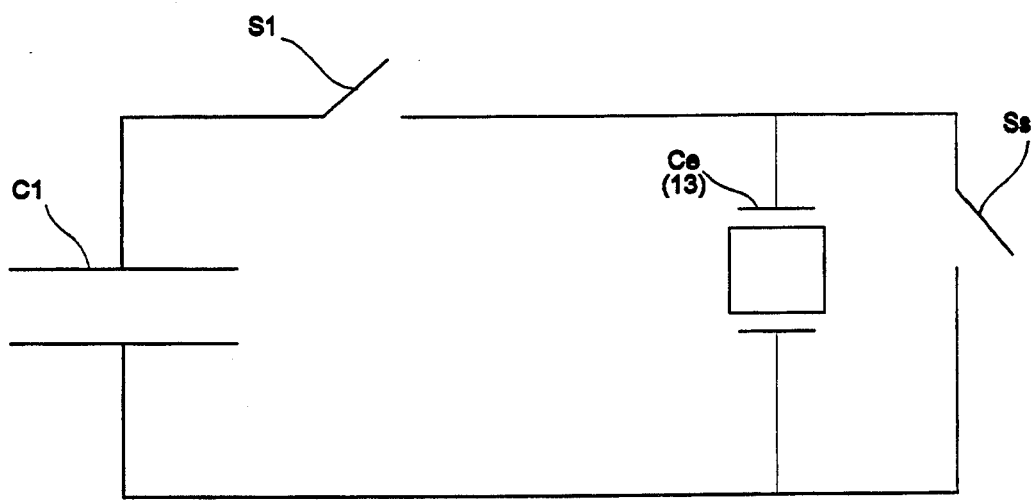
Figure 1D:
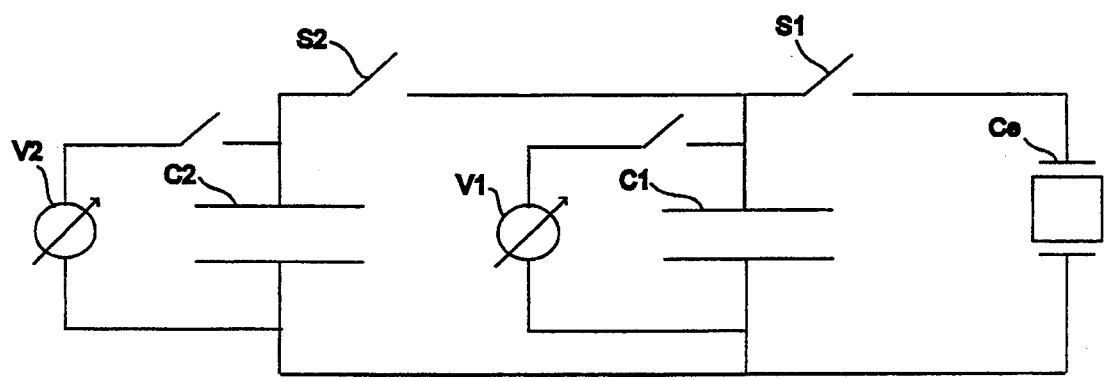
Figure 1E:
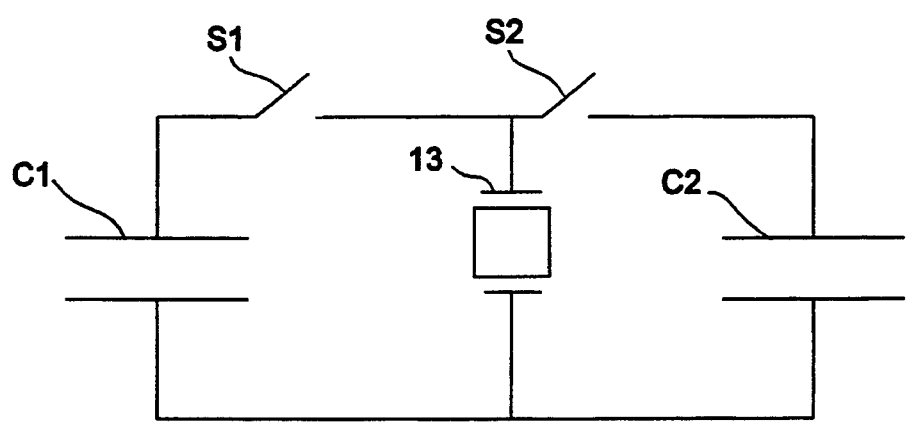
Figure 1F:
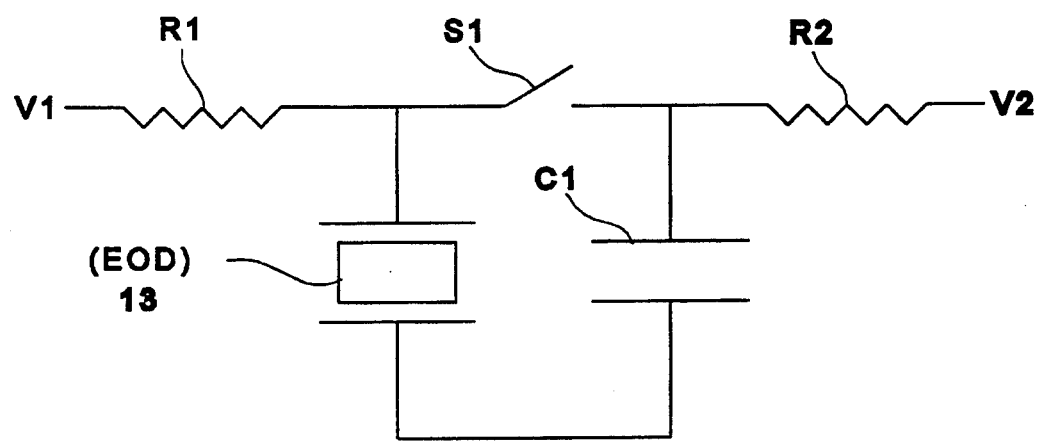

Turning now to FIG. 1(f), there is depicted an alternative embodiment which illustrates the above principle. In FIG. 1(f), the EOD 13 is placed in parallel with a capacitor C1 via the switch $S_1$. Assuming the EOD 13 and capacitor C1 are charged to voltages V1 and V2 (from voltage sources not shown) through resistors R1 and R2, respectively, and assuming the values of R1 and R2 are sufficiently large that there is negligible current through these resistors during the charge transfer process, then the final voltage across the EOD 13 and the capacitor C1 after the switch $S_1$ is closed may be given by:

$$V_f = \frac{1}{C_e + C1} (V1\, C_e + V2\, C1) \qquad (2)$$

Since V2 can be negative in polarity relative to V1, $V_f$ may also be negative relative to V1; this change in polarity can be effective in counteracting the piezo-optic effect encountered when using an EOD fabricated from certain materials, such as for example, lithium niobate.

In the first two preferred embodiments illustrated in FIGS. 1(a) and 1(b), the EOD 13 can only undergo a single state change controlled by the light activated switches $S_1$ and $S_s$, respectively. This type of operation is useful, for instance, where the EOD is used as a single stage optical shutter or where the EOD is used to Q-switch a laser.

Figure 2A:
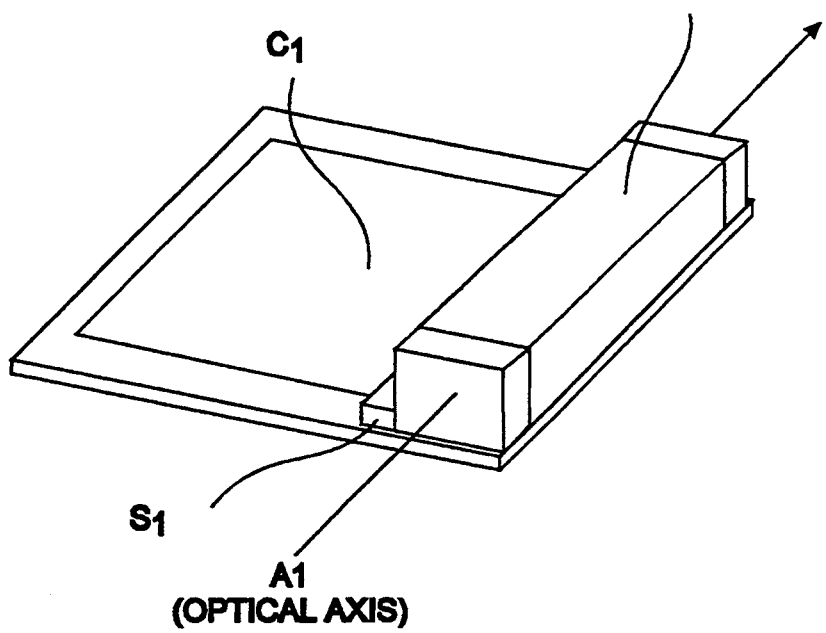
FIG. 2(a) is a schematic representation of a physical realization of the preferred embodiment whose circuit is shown in Fig. 1(a)

An example of an optical-to-optical modulator embodying the invention as so used will now be described with reference to FIGS. 2(a) and 3.

EXAMPLE 1

An optical-to-optical modulator controlled by a single light activated switch according to the present invention was used for several applications, including Q-switching of lasers and fast shuttering of optical signals. The optical-to-optical modulator was constructed using an x-cut $7.45 \times 7.45 \times 21$ mm$^3$ lithium niobate crystal as the EOD, bonded to a copper plate using conductive epoxy, and with the electric field applied transversely in a vertical direction. The optical-to-optical modulator was constructed in accordance with the circuit schematic shown in FIG. 1(a) and had the physical configuration depicted in FIG. 2(a). In accordance with this example, the parameters of which are intended to be illustrative only and are in no way to be viewed as limiting the scope of the invention, a section of 250 μm thick copper-coated kapton, acting as storage capacitor C1 and with a light activated switch $S_1$ located at one end, was pressure mounted to the side of the lithium niobate EOD 23, in this case a Pockels cell having optical axis $A_1$. The capacitor C1 measured 2 cm long and 3 cm wide and was connected to a variable-dc high voltage power supply through a 10 MΩ charging resistor. The light activated switch $S_1$ was mounted close to the crystal to reduce circuit inductance. The upper electrode of the EOD 23 was connected to the light activated switch $S_1$, using copper foil. The switch $S_1$ was a reverse-biased silicon junction, approximately 1 mm high, 1 mm in length (in the direction of the electric field) and 1 cm wide. A 3 MΩ bleed resistor (not illustrated) placed in parallel with the EOD 23 did not affect the high speed (sub-nanosecond) operation of the circuit (time constant $RC_e \sim 160$ μs) but ensured that the optical-to-optical modulator could be reset between shots. In this exemplary configuration, the storage capacitance ($C_1$) was equal to 40 pF and the EOD capacitance ($C_e$) was equal to 15 pF. Therefore, in accordance with Eq. (1), capacitor C1 had to be charged to a factor of 1.38 higher than the desired equilibrium voltage, $V_f$, on the EOD 23. As would be apparent to the artisan, other methods of construction and fabrication of the optical modulator could be applied. For instance, rather than employing separate, bulk components as is shown in FIG. 2(a), the optical-to-optical modulator could be constructed using integrated circuit techniques.

Using techniques described in application Ser. No. 07/958,144, the configuration described above was operated to function as an optical shutter for blocking unwanted portions of a laser pulse, or for blocking the laser pulse altogether.

Figure 3:
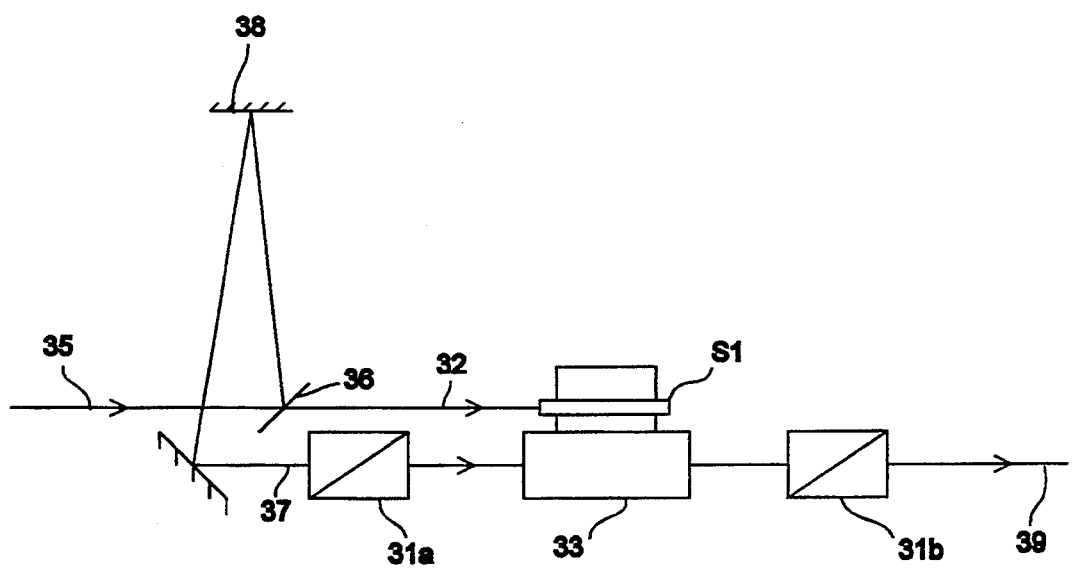
FIG. 3 is a schematic representation of an example of an optical system in which an optical-to-optical modulator is operated as a fast shutter; e.g., for protecting optical sensors.

An exemplary optical shutter configuration for the above discussed application is illustrated in FIG. 3. In FIG. 3, an EOD 33 is located between polarizers 31a and 31b which are oriented parallel to each another. A small portion 32 of an incoming laser beam 35 is transmitted on to a light activated switch $S_1$ by means of a beamsplitter 36. The main portion of the laser beam 37 is passed through a short optical delay 38 so that it reaches the EOD 33 after the voltage on the EOD has reached a half-wave retardation value. The result is that the majority of the main laser beam is reflected by the polarizer 31b out of the optical axis 39. An optical-to-optical modulator so configured is useful as a fast shutter, such as may be required in optical equipment having a light detector which requires protection against incoming laser pulses which may otherwise damage the detector. This type of optical shutter has been shown to operate with an extinction ratio, i.e., reduction in the transmitted laser light, of greater than 1000.

EXAMPLE 2

Figure 4:
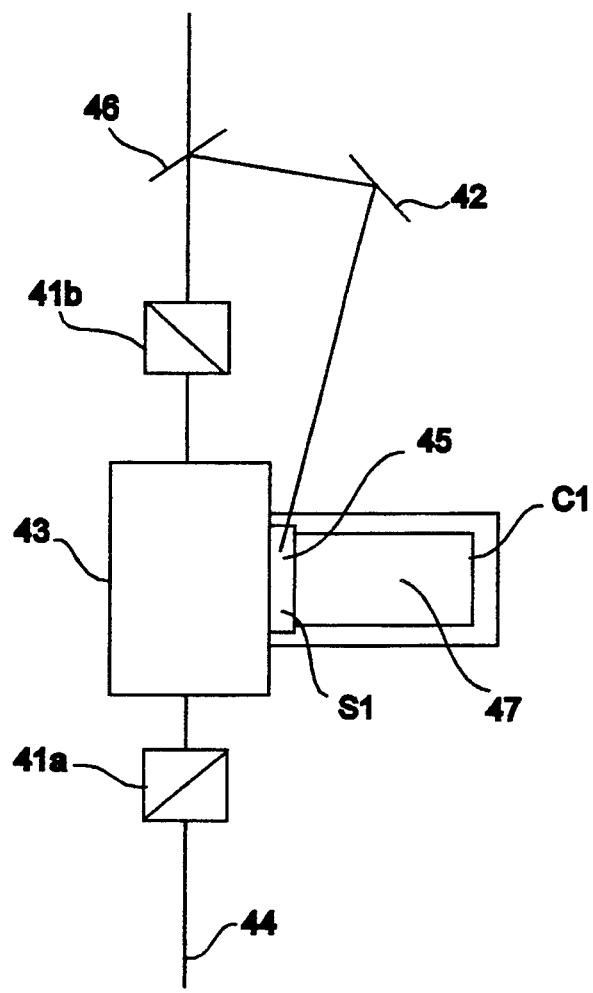
FIG. 4 is schematic representation of an example of an optical system in which an optical-to-optical modulator is used in an optical feedback circuit for shortening the risetime of output laser pulses.

Another example of a single stage optical-to-optical modulator using the same basic electrical circuit; i.e., that of FIG. 1(a), in this example fashioned as a fast response, positive feedback circuit, is depicted in FIG. 4. In FIG. 4, the polarizers 41a and 41b are transversely oriented relative to each other, so that light is rejected by the polarizer 41b when no voltage is applied to the EOD 43. A beamsplitter 46 following the polarizer 41b directs a portion of the light which has been transmitted through the polarizer 41b on to the light activated switch $S_1$. Since a polarizer does not produce ideal polarized components, most but not all of an incoming laser pulse 44 is initially "rejected" by the polarizer 41b. The small portion of the incoming pulse 44 which is transmitted by the polarizer 41b, is fed back onto the light activated switch $S_1$ which begins to close, thus applying a voltage to the EOD 43 by means of the charge on the capacitor(s) $C_1$. As the voltage applied to the EOD 43 increases, the fraction of beam transmitted by the polarizer 41b increases, thus increasing the illumination of the light activated switch $S_1$. As will be appreciated by the artisan, this optical configuration functions as an optical, positive feedback circuit in the form of an optical-to-optical modulator having the ability to respond in times shorter than the length of the optical signal pulse.

Figure 5A:
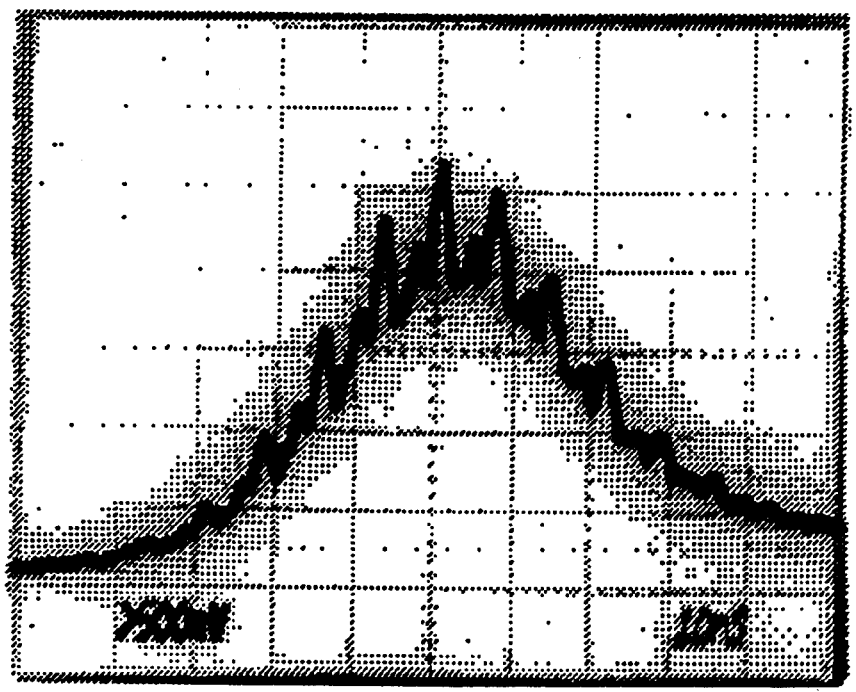
FIGS. 5(a) and 5(b) are pulse traces illustrating an example of the operation of the system shown in FIG. 4.
Figure 5B:
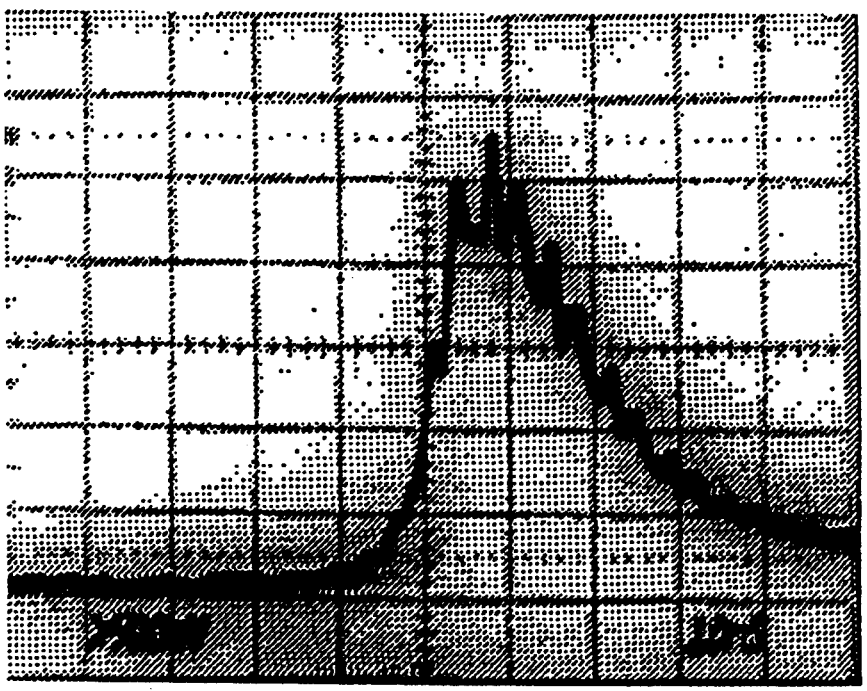

FIGS. 5(a) and 5(b) are oscilloscope traces of a laser pulse before and after entering the feedback optical-to-optical modulator of FIG. 4. In the traces shown in FIGS. 5(a) and 5(b), the sweep speed is 10 n.sec./div. The trace of FIG. 5(a) is the input laser pulse 44 which (in the trace) is a pulse of about around 40 nanoseconds duration (full width half maximum) with a 10%–90% risetime of about 35 nanoseconds. The trace of the pulse transmitted by the feedback optical-to-optical modulator is shown in FIG. 5(b). This pulse has a full width half maximum duration of around 25 nanoseconds with a 10%–90% risetime of about 8 nanoseconds. As should be appreciated from these results, the optical-to-optical modulator operating in this feedback mode has a significant effect in reshaping the original pulse.

As will now be described with reference to various other embodiments of the invention, multiple state changes of the optical-to-optical modulator are possible, which make it possible to accomplish more complex optical operations. Referring now to FIG. 1(c), there is depicted an electrical circuit which is identical to that shown in FIG. 1(a) but having an additional switch, in the form of a light activated shorting switch, $S_s$, such as that used in FIG. 1(b), connected in shunt with the EOD 13. In this circuit, the first light activated switch $S_1$ is activated to change the state of the EOD 13 to that corresponding to the voltage $V_f$ (Eq. (1)). Subsequent activation of the switch $S_s$ results in the total or partial removal of that voltage at some later point in time. Since switches $S_1$ and $S_s$ are independent of each other, the time between activation of the switches $S_1$ and $S_s$, δt, can be selected to suit the particular application in which this embodiment is employed.

In the embodiment of FIG. 1(c), the closure of the switch $S_s$ may, depending on whether there is sufficient charge present in the light activated switch $S_1$ when switch $S_s$ is activated, result in the discharge of capacitor C1. If a large number of carriers remain in the switch $S_1$ when the switch $S_s$ is closed, then the capacitor C1 will discharge. If, however, there are no carriers in the switch $S_1$ when the switch $S_s$ is activated, whether due to carrier recombination or removal of the carriers by a current which flows through the switch $S_1$, then the capacitor C1 is effectively isolated from the switch $S_s$ and only the EOD 13 will be discharged when the switch $S_s$ is closed.

Figure 2B:
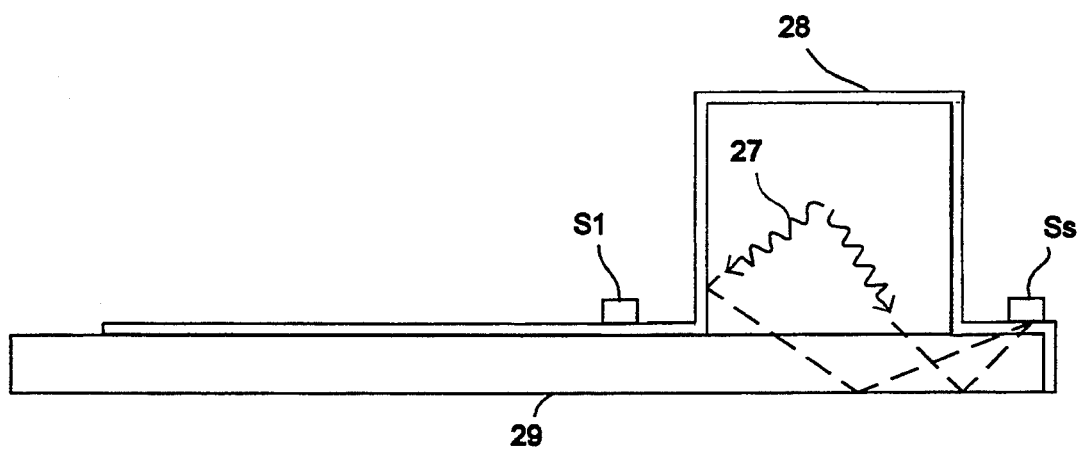
FIG. 2(b) is a representation of a physical layout of a circuit element illustrating the use of leakage light for semiconductor switch control.

FIG. 2(b) depicts an exemplary structure for using "leakage" light to close a switch. The structure illustrated in the example of FIG. 2(b) corresponds to the circuit of FIG. 1(c) wherein leakage light is used to close the switch $S_s$. In FIG. 2(b), a substrate 29 is used as a light guide for a leakage path 27 for light being scattered out of the EOD 28. While heretofore it has generally been thought desirable to avoid passing light to a light activated switch through a substrate, for purposes of providing a physically short switching path and faster response time, in the situation illustrated herein and discussed above, it has been found to be an effective way to implement the control circuit.

Still referring to the example of FIG. 2(b), when the substrate 29 is used as a light guide, light generated through the action of the switch $S_1$ results in light energy being transmitted by the EOD 28. The EOD 28 then scatters a portion of the transmitted light as schematically indicated by reference numeral 27, which travels through the substrate 29 to the switch $S_2$. When desired, conventional techniques can be employed to optically isolate the switch $S_s$ from the switch $S_1$ and the substrate 29.

Figure 6:
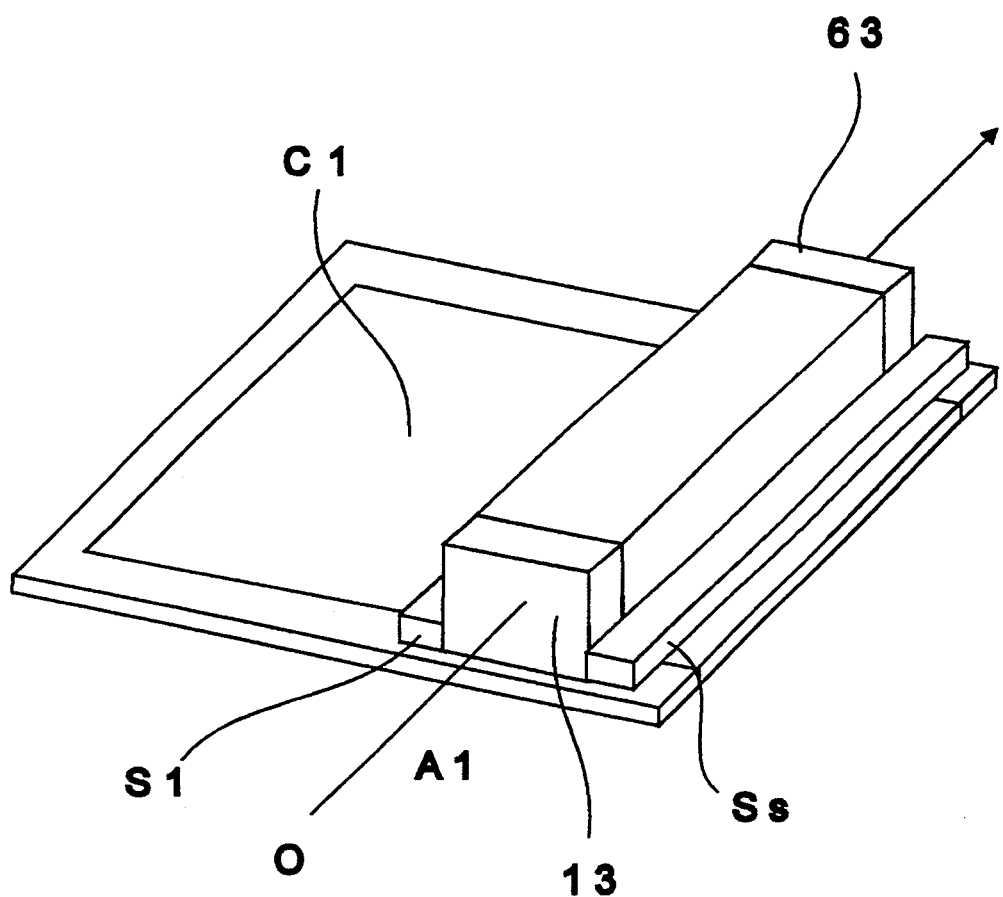
FIG. 6 is a schematic representation of an exemplary physical realization of a preferred embodiment of the circuit depicted in FIG. 1(c)

A physical example of the embodiment of FIGS. 1(c) and 2(b) will now be described in connection with FIG. 6. In this example, a shorting switch $S_s$ has been added to the lithium niobate-base single switch optical-to-optical modulator 23 described above in connection with FIG. 2(a). FIG. 6 depicts an exemplary physical relationship between the storage capacitor C1, the lithium niobate EOD 63, and the activating and shorting switches $S_1$ and $S_s$, respectively. The embodiment of the invention, as shown in FIGS. 1(c), 2(b) and 6, may be used, for example, to control a laser.

Figure 7:
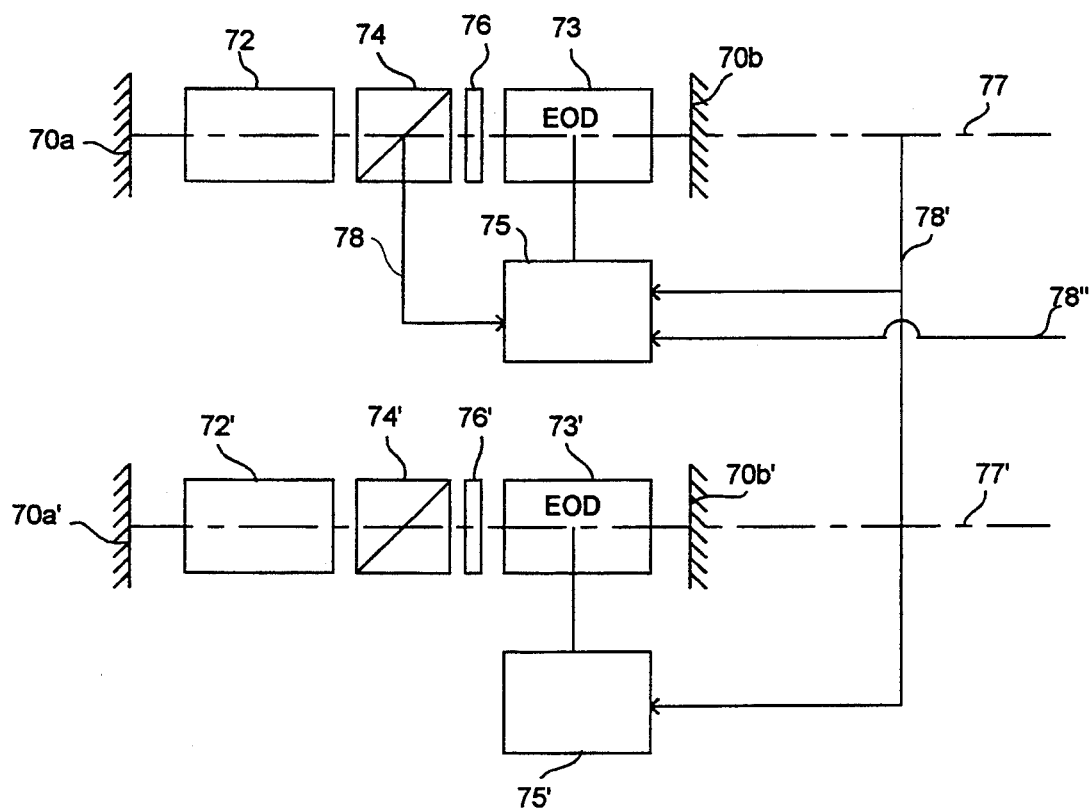
FIG. 7 is a schematic representation of a laser cavity having an optical-to-optical modulator and depicts an example of cascaded laser cavities.

An example of a laser cavity incorporating a two switch optical-to-optical modulator according to the present invention is illustrated in FIG. 7. In the embodiment of FIG. 7, an active laser medium 72 is contained within a Fabry-Perot cavity, or the like, formed by two end mirrors, 70a and 70b, each of which has a high reflection coefficient at the lasing wavelength. Preferably, the mirror 70a is a total reflection mirror, and the mirror 70b is an output mirror, typically having a reflectivity of 10–90%. The active medium in the cavity 72 of the laser is preferably, for example, Nd:YAG. However, as will be appreciated by the artisan, other types of active lasing media, including solid state, gas, or liquid types of active medium, may be used instead of the Nd:YAG active medium. Although the cavity shown in FIG. 7 is formed between two mirrors 70a and 70b, other cavity arrangements, such as a ring configuration, may be used. The laser cavity also contains an EOD 73, for example a Pockels cell, to enable the laser to Q-switch, and preferably may include a polarizer 74. The laser cavity may also contain a quarter wave retardation plate 76 or the EOD may be pre-biased to produce quarter wave retardation. The polarizer 74 may be inserted in the laser system either before (as illustrated) or after (not illustrated) the EOD 73. The Fabry-Perot cavity has a lasing axis 77.

The EOD 73 may first be controlled by switch 81 to change the cavity Q from a low value to a higher value, i.e., to Q-switch the laser. The output in this case is preferentially taken through the output coupling mirror, but may also be "polarization output coupled" by means of the polarizer 74. If the shorting switch $S_s$, is present, then the act of Q-switching may be followed by mode-locking, cavity dumping, controlled output, or a combination thereof, as described below.

To achieve a Q-switching and cavity dumping sequence, the population inversion is allowed to grow while the laser cavity Q is low. After the cavity Q is switched to a high value by closing the switch $S_1$, the population inversion falls as the optical energy builds up. This is the Q-switching part of the sequence. Then, when the switch $S_s$ is closed, thereby reducing the cavity Q to a low value, the optical energy stored in the laser cavity is released as an output pulse in a time which can be as short as the single round trip transit time of the cavity. This fast release of optical energy from the laser cavity is the cavity dumping part of the sequence.

As should now be apparent to the artisan, a laser system which relies on fast optical modulation to change the cavity Q of a laser, for instance for Q-switching or cavity dumping, requires a fast optical signal for operating the photoconductive switch, or switches, in the charge transfer circuit. Since the techniques described in this invention are useful for generating short laser pulses, the output from one such operated laser can be used as the optical signal to control a second laser operating at even faster speeds. Specifically, the present invention may be included in a cascade of optically controlled lasers (FIG. 7 illustrates a cascade of two lasers) where the optical output 78' from the laser system (including the EOD 73) is used as the control input signal to a second laser system, disposed on an axis 77' and including the mirrors 70a' and 70b', with active medium 72', polarizer 74', waveplate 76' and EOD 73', where the EOD 73' is controlled by a photoconductive switch, 75'. This second laser system may thereby generate a shorter optical signal than the first laser system. The output 77' of the second laser system may be a useful output in its own right or may be used to control a third, even faster laser system.

An important aspect of the invention is that the optical-to-optical modulator be made to be controllable to enable the laser cavity to perform a variety of functions. In order to accomplish this, the EOD 73, as described in more detail below, is controllable by an optical signal derived from within the laser cavity, e.g., signal 78, or from a signal external to the laser cavity, e.g., signal 78' taken from an output of the laser system, or a signal taken from an external source, e.g., signal 78''. It should be understood that the EOD 73 may take the form of devices other than Pockels cells, for example, Kerr cells, tunable Fabry-Perot filters, electro-optic deflectors or electro-optic lenses. The methods and structures for controlling the EOD to be responsive to the control signals, include the methods and structures described herein above and below for modulating light energy passing along the lasing axis 77.

Figure 8A:
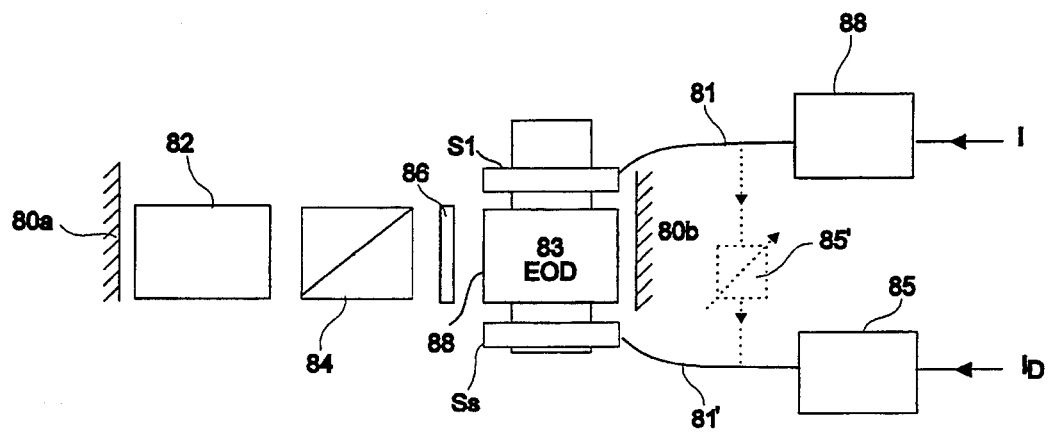
FIGS. 8(a) and 8(b) are schematic representations of embodiments of devices for activating the light activated switches of an optical-to-optical modulator.
Figure 8B:
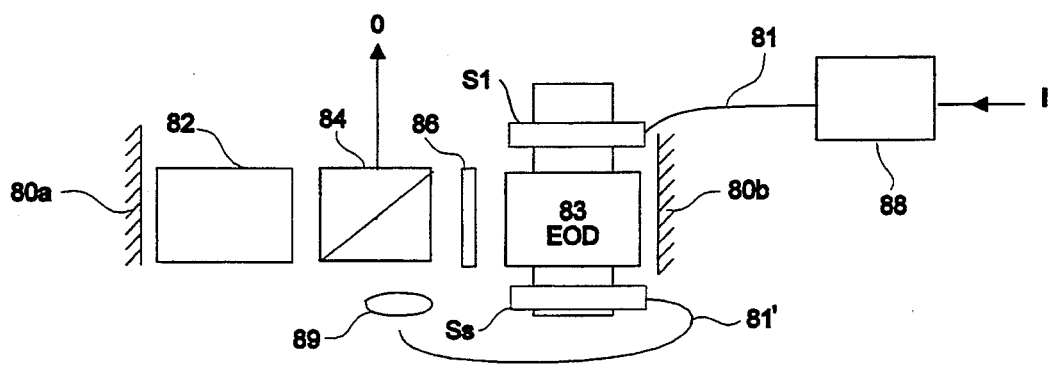

The EOD shunting switch $S_s$ may be activated by any of several devices, two examples being illustrated in FIGS. 8(a) and 8(b). In FIG. 8(a), the switches $S_1$ and $S_s$ (which respectively correspond to switches $S_1$ and $S_s$ of FIG. 1(c)) are separately controlled by optical control signals from laser diodes 88 and 85, respectively. In this case, the timing between the closing of the switches $S_1$ and $S_s$ is controlled by the current pulses I and $I_D$, which drive the laser diodes 88 and 85, respectively. Alternatively, as shown by the dashed line 89, a signal 81' for closing the switch $S_s$ may be derived from the output 81 of the laser diode 88 by passing it through a fixed or variable delay device 85.

In the embodiment of FIG. 8(b), the switch $S_1$ is controlled by an optical signal from an external laser diode 88, while switch $S_2$ is activated by optical radiation "leaking" out of the lasing cavity. Therefore, only one external electrical signal I is used to control the EOD 83. In this configuration, the leakage light is obtained from any suitable optical component, e.g., leakage light off of the polarizer 84 due to birefringence in the active medium, or leakage of light through one of the cavity mirrors 80a and 80b. The leakage light can be directed to the switch $S_s$ by, for example, mirrors or an optical fiber 81'. FIG. 8(b) illustrates leakage from the polarizer 84 being focused by a lens 89 into an optical fiber 81', and thence to the switch $S_s$. Since the optical energy in the leakage light is directly proportional to the optical energy of the intracavity radiation, the leakage peaks when the intracavity energy peaks. When switch $S_s$ receives an optical control signal and is closed, it shunts charge away from the EOD 83, thus reducing the cavity Q. The intracavity radiation is thereupon allowed to exit the cavity in a very short time. For the cavity configuration of FIG. 8(b), the radiation O exits from the polarizer 84 in the direction shown by the arrow. Reference may be had to applicants' copending application Ser. No. 07/985,144 for a more detailed description of the dynamics of the laser operated in the manner described.

Figure 9:
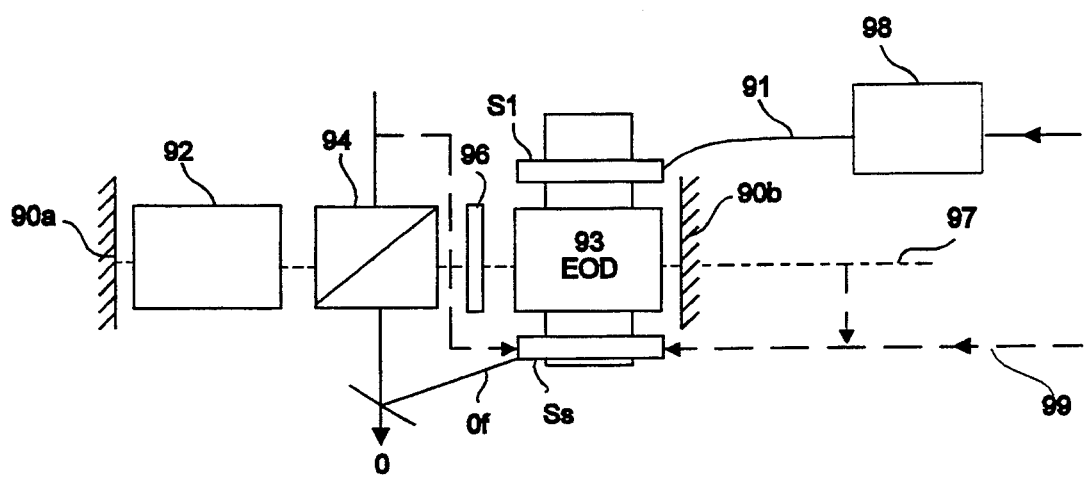
FIG. 9 is a schematic representation of a lasing system for Q-switching, mode-locking, cavity dumping and/or producing a controlled output signal.

Turning now to FIG. 9, an alternate method of activating the shunting switch $S_s$ is depicted, wherein a signal, which comprises a fraction of the output signal from the laser cavity, is used. As shown in solid by the line $O_f$, the shunting switch $S_s$ may be activated by light from the output signal $O_f$ alone. In this case, in order to control the switch $S_s$ to close, the optical control signal utilized comprises leakage light coming out of the laser cavity from a point along the output path O (indicated by the direction of the arrow). Alternatively, as illustrated by dashed lines in FIG. 9, the switch $S_s$ may be controlled by an optical control signal comprising a combination of light from the output signal O and leakage light, such as, for example, leakage light from the polarizer 94 or quarter wave retardation plate 96. In this case, the leakage light provides the energy source for the initial control of the switch $S_s$, which thereupon releases some output signal. In both cases, a fraction of the optical output signal is then fed to the switch $S_s$ as an optical control signal, which increases the output of the laser cavity, resulting in increased activation of the switch $S_s$, which results in an increase in the output O, and so forth. This positive feedback results in very fast switching of the EOD 93 and a fast risetime of the output pulse O in a cavity dumped pulse.

Alternatively, the shorting switch $S_s$ can be controlled by an optical control signal or signals from a combination of sources. For instance, if there was no leakage from the polarizer 94 in the direction of the output, some external signal or signal from the optical axis 97 of the laser may be used (as illustrated by the dashed lines to the left of EOD 93 in FIG. 9) to initiate a cavity dumping process. This may comprise leakage energy obtained through the end mirror 90b or energy from the side of the polarizer 94 which is opposite to the side from which output O is taken. It should be noted that the length of the feedback path can be extremely short and can be implemented using mirrors, or an optical fiber configured to feed light onto the shorting switch, or a combination of the two. The ability to closely couple the light activated switches and the EOD results in a minimal temporal delay in the control loop and extremely fast cavity dumping.

The time taken for the pulse to switch out of the cavity is determined by the fall-time of the voltage on the EOD 93 and the cavity round-trip transit time, whichever is longer. Applicants have found that a laser system using the basic configuration of FIG. 9 and having a laser about 8 cm in length has the capability of producing mJ pulses with a duration of around 0.5 ns. The pulse length generated also depends on how much leakage radiation is used to illuminate the switch $S_s$. Higher levels of illumination will cause switch $S_s$ to close earlier, resulting in shorter pulses. Use of smaller laser cavity lengths, i.e., of the order of a few millimeters, will reduce the pulse length to the picosecond regime.

The EOD 93 may also be controlled to mode-lock the laser cavity. One method of mode-locking the laser cavity may be performed by applying a time-varying voltage to the EOD 98, using the optical control signal 91, the signal $O_f$, the external optical control signal 99, or via a signal directly impressed on the EOD 98. If the voltage is made to vary at a frequency consistent with the frequency spectrum of the cavity (e.g., if the period of the voltage variation is similar to the round-trip transit time within the laser cavity), then the EOD 93 will mode-lock the optical energy within the laser cavity. As should now be apparent to the artisan, in accordance with the present invention, a single intracavity element can be used to control the functions of Q-switching, mode-locking and cavity dumping.

As should be further appreciated by the artisan, an optical-to-optical modulator according to the present invention may typically use several light activated switches for controlling the voltage on the EOD, for example to achieve one or various combinations of cavity dumping, Q-switching and/or mode locking. For example, as shown in FIG. 9, the switches $S_1$ and $S_s$ may be connected to opposite sides of the EOD 93. If the shorting switch $S_s$ is activated a short time after switch $S_1$ is closed, the electrical energy in the EOD 93 will be dumped. Generally, the switch $S_1$ may be used to impress a first voltage across the EOD 93 (or otherwise transfer charge to or from the EOD 93) and the switch $S_s$ may thereafter be controlled to alter that voltage. For the particular configuration of FIG. 9, closing the shorting switch $S_s$ results in the optical energy being coupled out of the cavity from the polarizer 94 (i.e., cavity dumping).

FIG. 1(d) illustrates another preferred embodiment of the invention which uses a two-state switching circuit. In this embodiment the applied control voltage across the EOD 13 can be further controlled (i.e., increased or decreased) by means of a second voltage source. As will be appreciated by the artisan, the embodiment of FIG. 1(d) is yet another modification of the circuit of FIG. 1(a), which includes a second storage capacitor C2 and a second light activated switch S2 connected in a ladder circuit with the capacitor C1 and switch $S_1$. The ladder terminates at the EOD 13. In this embodiment, a first voltage, V1, resulting from the charge on the capacitor C1 supplied by voltage source $V_1$ can be applied to the EOD 13 by controlling the switch $S_1$. Controlling the switch $S_2$ to close will result in the application of a second voltage V2, proportional to the charge on the capacitor $C_2$, across to the EOD 13. The charge which results in the voltage V2 across the capacitor C2 is supplied by voltage source $V_2$. The voltage sources $V_1$ and $V_2$ are both preferably controllable voltage sources, both in terms of voltage magnitude and polarity. Alternatively, the capacitors C1 and C2 can be charged from a selected one of a plurality of fixed voltage sources. The value of the voltage V2 impressed across the EOD 13 will depend on the relative capacitances of the capacitors C1 and C2, the capacitance $C_e$ of the EOD 13, and the amplitudes of the voltages across the capacitors prior to switching. For instance, if the charge stored on the capacitor C2 is higher than the charge stored on capacitor C1; then the voltage V2 will be higher than the voltage V1. As alluded to above, it is possible to choose V2 to be zero or even negative in amplitude relative to V1. In order to change the voltage across the EOD 13 from V1 to V2, the circuit must drive current through the switch $S_2$. If the switch $S_1$ is open or if it has opened up or has been drained of carriers by the time the switch S2 is activated, then the voltage on the EOD 13 will not be affected by the activation of switch S2.

A further alternative embodiment of the invention is illustrated in FIG. 1(e). In FIG. 1(e), the switch $S_2$ and capacitor C2 are connected in parallel with the EOD 13. In this embodiment, closing of switch $S_2$ will affect the voltage across the EOD 13, irrespective of whether the switch $S_1$ is open or closed. However, the value of the final equilibrium voltage, V2, will be affected by the state of the switch $S_1$, since the capacitor C2 may discharge either into a "capacitor" of value $C_e$ or a "capacitor" of value $C_e+C1$, depending on whether switch $S_1$ is open or closed. By connecting additional switched capacitors or dc voltage sources into the circuit of either FIG. 1(d) or FIG. 1(e), the dc voltage across the EOD 13 can be controlled as desired. The choice between a circuit such as that depicted in FIG. 1(d) or such as that depicted in FIG. 1(e) depends largely on the design and function of the modulator.

Figure 10:
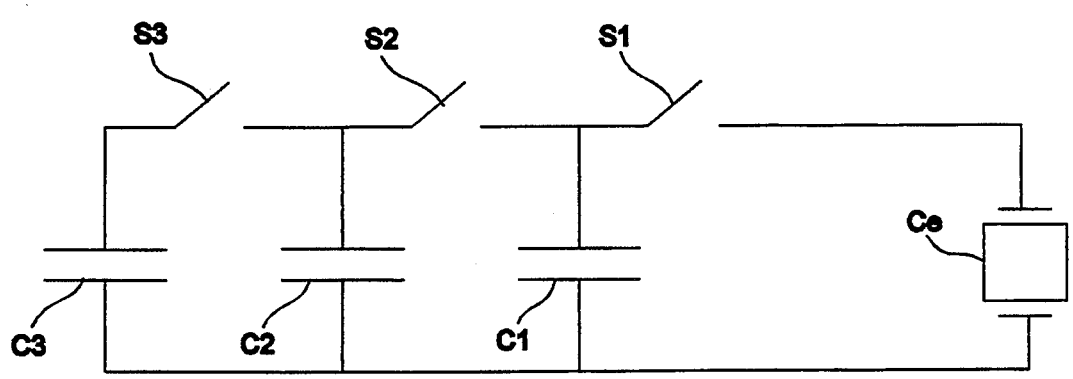
FIG. 10 is a schematic representation of another embodiment of an electrical circuit used to control an optical-to-optical modulator using multiple charge sources and light activated switches.

To those skilled in the art, it is obvious that many combinations of the switched circuits described herein can be made so that essentially any desired voltage can be impressed across the EOD at essentially any desired time, simply by adding switched storage capacitor circuits and/or shorting switches to supply charge to or remove charge from the EOD. One such combination is shown in FIG. 10 where a third switch and capacitor circuit is incorporated into a circuit similar to that illustrated in FIG. 1(d). In this example, the third activating switch $S_3$ and storage capacitor C3 permits the EOD 103 to be controlled to a third switched state.

Although only three light activated switches and storage capacitors are shown in FIG. 10, as will be appreciated by the artisan after reading this specification, any number of light activated switch and storage capacitor circuits may be used. Further, these light activated switches may be located on either side of the electro-optic device 103 and may connect a capacitive element either directly to the EOD 103 upon switch closure or via another light activated switch. Alternatively, two or more light activated switches may receive the same optical input control signal or a signal derived from the same optical input control signal. The voltage on each of the capacitive elements may be of the same or opposite polarity, and may be varied independently by means of the voltage source(s) used to charge each of the capacitive elements.

As should now be understood by the artisan, by using the teachings of the present invention, a circuit and corresponding structure can be designed in which virtually any combination of control voltage levels can be generated and in which the electro-optic device can be controlled to modulate the optical energy as desired. For example, consider the case where the three switch optical-to-optical modulator of FIG. 10 is employed to control a laser. Closure of the switch $S_1$ will result in the laser being Q-switched. Unlike in the cavity dumped case described earlier, the switch $S_2$ of FIG. 10 may be used to reduce the cavity Q so that some of the intracavity radiation is output by the laser. The switch $S_3$ may then be used to recover the cavity Q, resulting in the termination of the output signal. Thus, rather than cavity dumping, in which all the optical energy contained within the laser cavity is used as output signal, this method of "controlled output" may be used to emit a portion of the stored optical energy, but maintain a significant fraction stored within the cavity. As should now be apparent to the artisan, repeated operation of the controlled output at frequent intervals would result in the generation of a train of output pulses.

Figure 11:
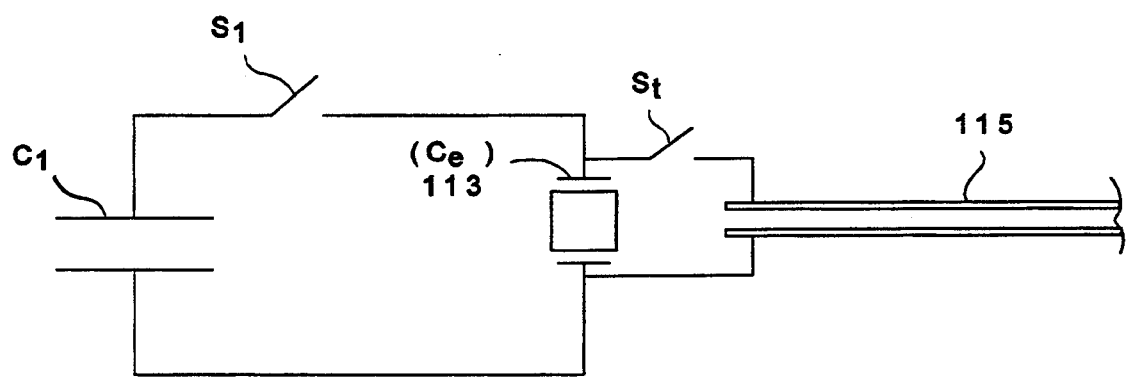
FIG. 11 is a schematic representation of another embodiment of an electrical circuit used to control an optical-to-optical modulator which includes a transmission line for removing the voltage from an EOD.

It is well known in electrical circuit theory that the fastest method to remove a voltage from a component is to connect it to a transmission line whose characteristic impedance matches that of the component in question. Thus instead of using a shorting switch (as illustrated in the embodiment of FIG. 1(b)) to set the voltage on the EOD to zero, a further modification, as illustrated in FIG. 11, uses a light activated switch $S_t$ to connect the EOD 113 to a transmission line 115 whose impedance is matched to that of the EOD 113. In this embodiment, the light activated switch $S_t$, when closed, connects the EOD 13 to a section of impedance matched transmission line 115 which, as illustrated, may be a semi-infinite line. In practice, the transmission line may be terminated by a matched load or may simply be sufficiently long that a signal reflected from the far end of the transmission line arrives back at the EOD 113 outside the time span of interest.

In most applications, the switch carrier lifetime must exceed the duration of electrical transient(s) in switching from one voltage level to the next, or the switches will require continual illumination until the final equilibrium voltage has been reached. As alluded to above, non-linear switches, such as avalanche or lock-on switches, are not recommended for fast switching. Rather, linear switches, where each carrier pair is created from the absorption of one photon, is preferred.

Figure 12A:
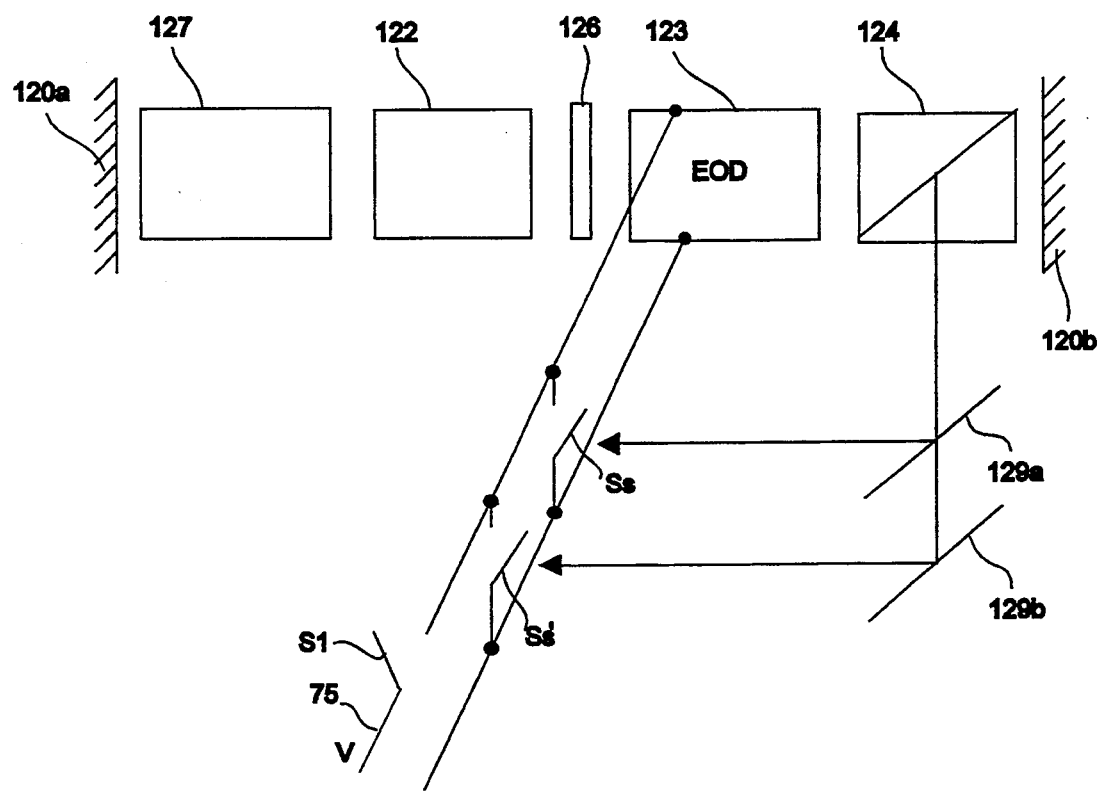
FIGS. 12(a) and 12(b) are, respectively, a schematic representation of a further embodiment of a lasing system having an optical-to-optical modulator having fast and slow switching for accomplishing mode-locking, and an exemplary physical realization illustrating an EOD integrated into a charge transfer structure.

Either of the methods of mode-locking discussed above with reference to FIG. 9 or other methods of mode-locking known in the art may also be used in conjunction with Q-switching and/or cavity dumping for producing a controlled output. For example, as illustrated in FIG. 12(a), one or more light activated switches $S_1$ may be used to apply a voltage V across the EOD 123. Light activated switches $S_s$ and $S'_s$ are connected in parallel across the voltage source V for shorting the voltage applied across EOD 123. The EOD 123 is in a laser cavity between end mirrors 120a and 120b. In the example illustrated, a polarizer 124, a quarter wave retardation plate 126, a laser 122 and an optional dye cell 127 are positioned along the axis of the laser.

In this example, the light activated switch or switches $S_1$ may be used for Q-switching the optical energy within the laser cavity and the light activated switch $S_s$ may be used for feedback mode-locking the laser cavity. As depicted in FIG. 12(a), the light activated switch $S_s$ receives a fraction of the pulse output energy from the polarizer 124 as an optical input control signal via the feedback path including the mirror 129a. These pulses, as described above, mode-lock the laser cavity to the frequency of the pulses.

Instead of feedback mode-locking the laser cavity, the laser cavity may instead be mode-locked by applying a voltage having a frequency in tune with the cavity resonance. This voltage may be applied with the sequential switching embodiment generally described in applicants' copending application Ser. No. 07/985,144.

The light activated switch $S_s'$ may be used for cavity dumping, or for producing a controlled output signal. The switch $S_s'$ receives at least a portion of the light representing its control signal from the polarizer 124 via the feedback path including the mirror 129b. For cavity dumping, the switch $S_s'$ is preferably activated or closed when the optical energy within the cavity is at a maximum. Alternatively, for either cavity dumping or for producing a controlled output signal, the light activated switch $S_s'$ may simply be responsive to an optical input control signal which comprises light from intracavity element within the laser cavity, or, as illustrated by dashed line, from an external source.

As alluded to above, the light activated switch $S_s$ may be used to mode-lock the laser cavity and should, therefore, preferably have a short carrier lifetime, i.e., a fast-recovery, light-activated switch. In comparison, the light activated switch $S_s'$ will advantageously have a longer carrier lifetime, and should therefore preferably be a light activated switch having a slower recovery than the switch $S_s$.

It should be appreciated that one reason the device of FIG. 12(a) accomplishes mode-locking is because there are not enough carriers produced by the control signal to maintain the switch $S_s$ closed. In other words, the resistivity of the switch $S_s$ partially recovers between light pulses. In that regard, applicants have found it advantageous to include the dye cell 127 within the laser cavity. It has been found that a low concentration of dye enhances the quality of the output pulse, or pulse train, by reducing inter-pulse noise which arises due to incomplete recovery of the EOD 123 between pulses.

Figure 12B:
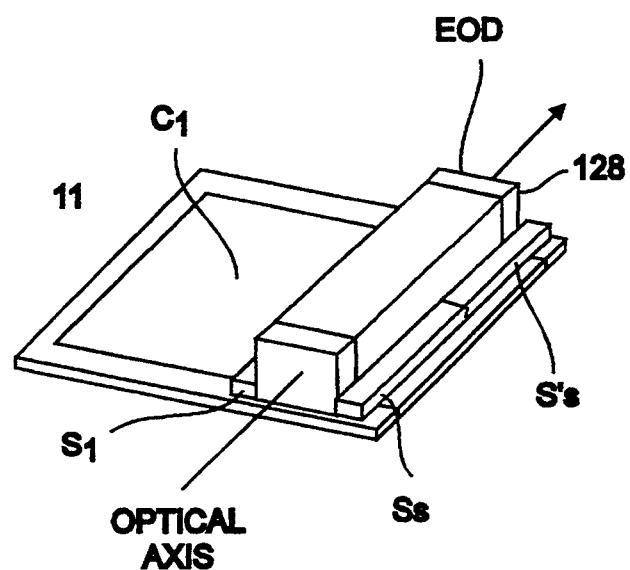

FIG. 12(b) illustrates an exemplary physical embodiment of an EOD integrated in a switched transmission line structure as illustrated in FIG. 12(a). For feedback mode-locking, the switch $S_1$ may have dimensions in the range of a few μm to around 1 mm in height and length (as measured in the direction of the applied electric field) and from around one to many mm in width. The two shorting switches shown, $S_s$ and $S_s'$, will typically have dimensions in the same regime as switch $S_1$, except that the width of switches $S_s$ and $S_s'$ will, in the case shown, advantageously be about one-half the width of switch $S_1$. Both the thickness and height of the EOD 123 can range from several μm to a few mm. The optical path length of the EOD is set mainly by the EOD material characteristics.

Figure 13:
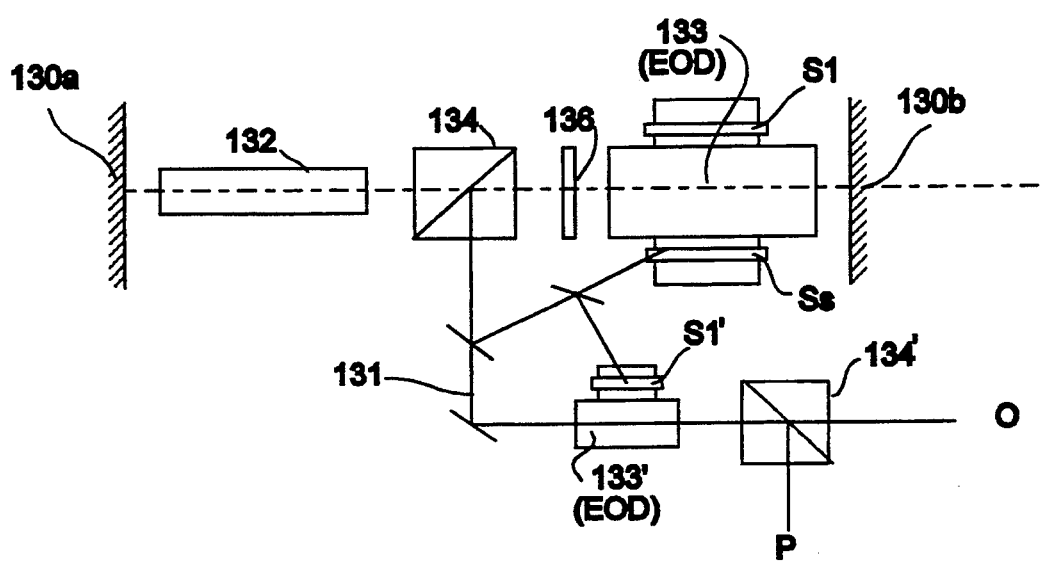
FIG. 13 is a schematic representation of another embodiment of the invention in which the light is modulated using modulated light from another laser system.

As will be appreciated by the artisan, the optical-to-optical modulator can be used to modulate light emitted by a laser which itself was controlled by an optical-to-optical modulator. This is known as a positive feedback or feed forward configuration, an example of which is illustrated in FIG. 13. FIG. 13 is based on the positive feedback cavity dumped laser illustrated in FIG. 9. Here, a second electro-optic device (EOD2) 133' is followed by a polarizer 134', the combination of which is used to eliminate the leakage light seen in the output O during the early part of the pulse. In operation, before the output from the polarizer 134 reaches a certain threshold magnitude, the second electro-optic device (EOD2) 133' passes light output from the polarizer 134 unrotated. The output from the electro-optic device (EOD2) 133' is then dumped from the second polarizer 134' as a pre-pulse P (or pre-pulses if the laser is mode-locked). Once the magnitude of the output from the polarizer 134' reaches the threshold value, the second electro-optic device EOD2 133' rotates the output, thereby causing light from the output of the polarizer 134 to pass through the second polarizer 134' as an output signal O. Thus, the output of polarizer 134 is used to switch its own pulse selector.

Figure 14:
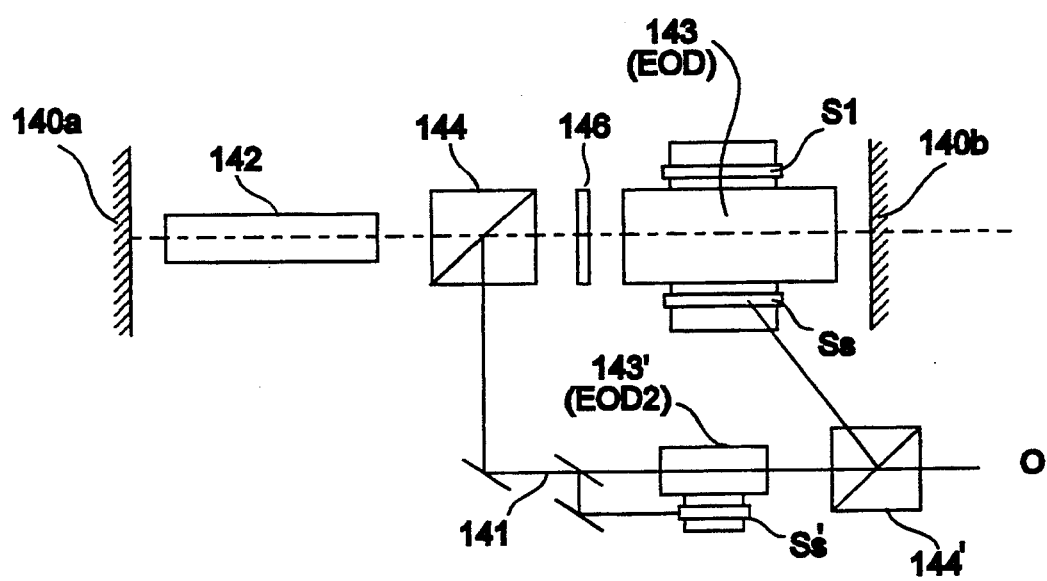
FIG. 14 is a schematic representation of yet another embodiment of the invention in which two optical-to-optical modulators are used within the same laser system in a feedback configuration.

A second example of two optical-to-optical modulators being used in the same system is illustrated in FIG. 14. In this example, the two modulators are connected in a feed-back configuration. In this configuration, rather than having a fixed fraction of the output directed to the closing switch $S_s$ as in the positive feedback cavity dumped system illustrated in FIG. 9, the second optical-to-optical modulator 143' is used to vary the percentage of light sent to the switch $S_s$. In the example of FIG. 14, the percentage of output light illuminating the light activated switch $S_s$ when the intracavity light level is low is high and the percentage of the output light illuminating the light activated switch $S_s$ when the intracavity light intensity is high is low. In FIG. 14, the first control loop for the second electro-optic device (EOD2) 143' includes a second control loop between the polarizer 144 and the EOD 143. As shown in FIG. 14, the (EOD2) 143' and the second polarizer 144' are positioned in the control loop between the polarizer 144 and the light activated switch $S_s$ of the EOD 143. The second electro-optic device (EOD2) 143' and the polarizer 144' allow light to pass through and onto the light activated switch $S_s$ with a small fraction of the light being diverted to a light activated switch $S_s'$ used for turning the (EOD2) 143' on. When the level of light escaping from the cavity via the polarizer 144 through the control loop is low, a high percentage of the light energy being fed to the light activated switch $S_s$ will pass through (EOD2) 143' unrotated and onto the light activated switch $S_s$. However, if the amount of light passing through the (EOD2) 143' increases, the (EOD2) 143' is gradually turned on and the percentage of light energy reaching the light activated switch $S_s$ is reduced. As should be apparent to the artisan, the (EOD2) 143' should not reduce the light energy to the EOD 143 to the extent where a cavity dumping is prevented.

Figure 15:
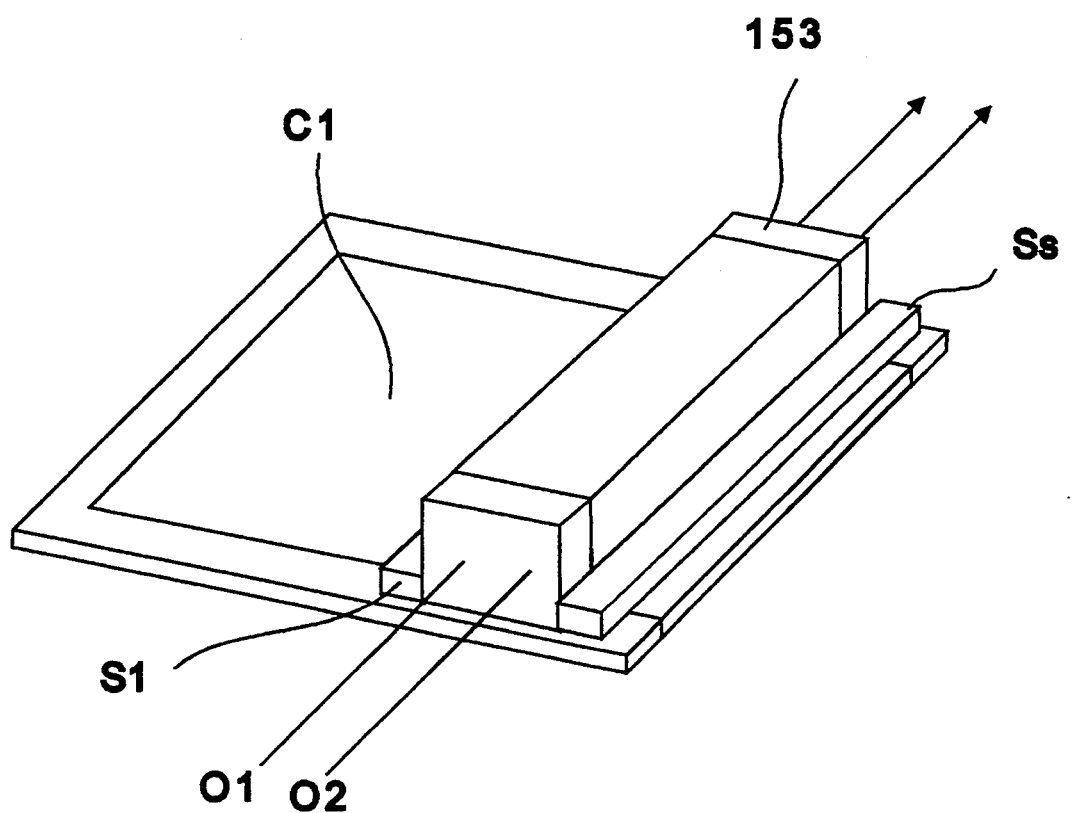
FIG. 15 is a schematic representation of a physical embodiment of the invention, wherein a plurality of laser beams are modulated by a single modulator.

Turning now to FIG. 15, there is illustrated an example of the use of an electro-optic device controlled by one or more light activated switches to control a plurality of beams from parallel lasers. Instead of using a single electro-optic device EOD to modulate a single optical beam O (as shown, for example, in FIG. 6), in the example of FIG. 15 a single electro-optic device EOD 153 is used to modulate a plurality of optical beams. As illustrated in FIG. 15, a single electro-optic device 153 modulates optical beams $O_1$ and $O_2$ in accordance with a common applied voltage, determined by the closing of switch $S_1$ and by the charge transferred to or from the capacitor C1. As should now be apparent, the number of switches and capacitive storage elements connected to the EOD may be arbitrary, as is the voltage associated with each capacitive element. Thus, a plurality of lasers acting in parallel may be made to operate in perfect synchronism, light energy from those lasers being modulated as desired.

Figure 16:
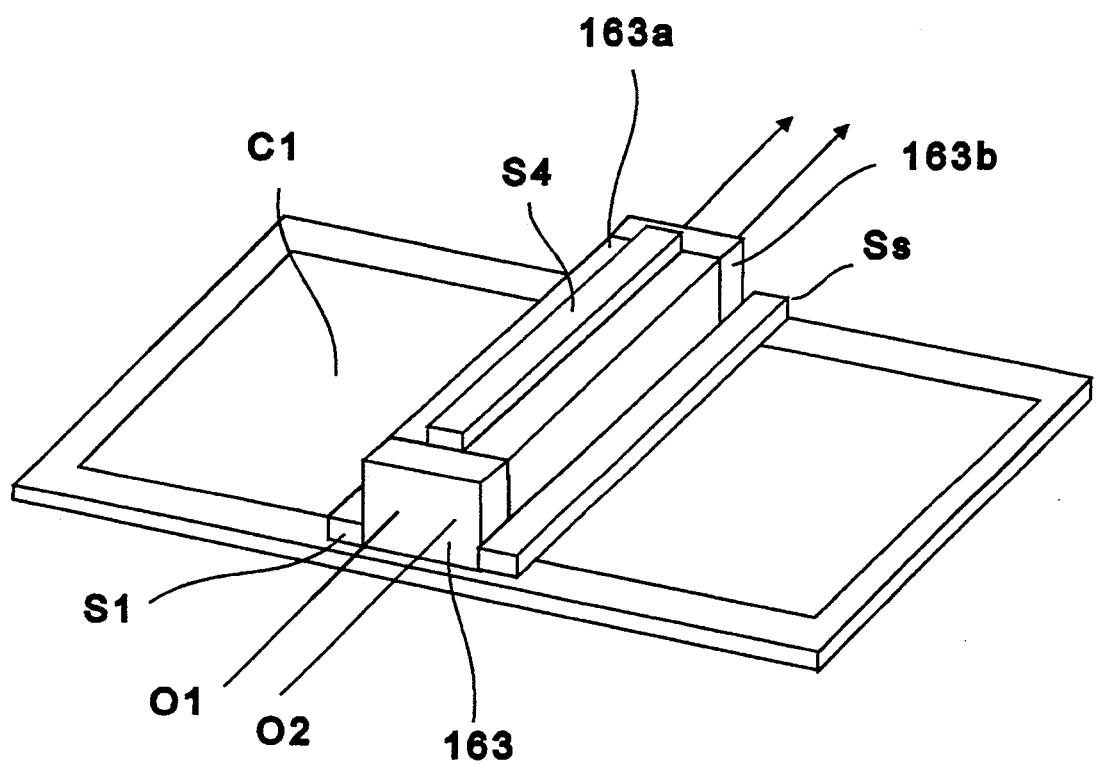
FIG. 16 is a schematic representation of a physical embodiment of the invention wherein a plurality of laser beams may be independently modulated by sections of a single modulator.

Further, as shown in the example of FIG. 16, a single electro-optic device 163 may also be used to modulate a plurality of beams $O_1$ and $O_2$ in accordance with a plurality of applied optical control voltages applied to separate parts of the EOD material. FIG. 16 illustrates an example in which separate sections of a single EOD modulator structure, 163a and 163b, may be used to modulate a plurality of beams $O_1$ and $O_2$, on an independent basis by separating the sections of EOD with a switch $S_4$. Thus, by appropriate timing of the application of control signals to close the light activated switches and thereby control application of the control voltage on selected sections of the EOD 163, each optical beam may be separately modulated or otherwise controlled by the light activated switches even though only a single EOD 163 is used. It should be appreciated that closure of the switch $S_4$ will result in the simultaneous control of EOD sections 163a and 163b.

As should be apparent to the artisan, in the examples shown in FIGS. 15 and 16, if the beam O1 is a laser beam which is within the laser cavity, beam O2 may either be a laser beam within a second laser cavity or an external optical beam which is outside the laser cavity in which the beam O1 is generated.

As will now be appreciated by the artisan, it is well within the scope of the present invention to employ other methods and structures, similar to those described in applicants' copending application Ser. No. 07/985,144 to control the modulation of light energy by a single or by multiple EODs, using appropriately more complex combinations of EODs and light activated switches for more advanced optical signal processing applications.

It is well understood by those skilled in the art that the wavelength of light emitted by a laser system can be converted to other wavelengths through nonlinear optical processes such as frequency doubling, sum or difference frequency mixing, optical parametric oscillation (i.e., where light is converted from a fundamental wavelength to two different wavelengths whose photon energies sum to the photon energy of the fundamental wavelength.) In general, these wavelength conversion processes occur more efficiently where the peak optical power is increased. Many of the laser embodiments described above result in the production of high power laser pulses, and it is therefore logical to allow that laser embodiments resulting from this invention may preferentially be used in order to benefit from an increase in the efficiency of conversion from the laser wavelength to other wavelength(s).

The foregoing description of the preferred embodiments of the invention has been presented for purposes of illustration and description. It is not intended to be exhaustive or to limit the invention to the precise forms disclosed. Many modifications and variations are possible in light of the above teaching.

For instance, the laser cavity may be implemented with bulk components or as an optically integrated structure. Additionally, the laser could be either simply Q-switched prior to cavity dumping, could be mode-locked prior to cavity dumping, or could be both Q-switched and mode-locked prior to cavity dumping. The size of the EOD can range, for example, from a few 10's of microns to several mm in the transverse dimension and approximately 0.1-50 mm in length.

The embodiments were chosen and described in order to best explain the principles of the invention and its practical application to thereby enable others skilled in the art to best utilize the invention and various embodiments and with various modifications as are suited to the particular use contemplated. It is intended that the scope of the invention only be limited by the claims appended hereto.

We claim:

1. An optical-to-optical modulator having an optical input control signal for controlling the modulation of an optical output, said optical-to-optical modulator comprising:
    a source of optical energy:
    modulating means, comprising a capacitive electro-optic material which is responsive to an applied control voltage for modulating optical energy passing therethrough to thereby generate a modulated optical output;
    changing means comprising at least one light activated switch optically connected to an input optical control signal, and a charge transfer circuit controlled by said at least one light activated, switch for changing the applied control voltage to said modulating means; and
    said modulating means being connected to said charge transfer circuit through said light activated switch wherein said optical input control signal controls said changing means by selectively varying the applied control voltage to said modulating means.

2. The optical-to-optical modulator according to claim 1, wherein said changing means includes at least two light activated switches optically connected to said input optical control signal.

3. The optical-to-optical modulator according to claim 2, wherein said optical input control signal comprises at least two optical control signals, each of said at least two light activated switches being optically connected to one of said optical input control signals.

4. The optical-to-optical modulator according to claim 3, wherein said changing means further comprises a plurality of capacitive voltage storing elements, each of said capacitive voltage storing elements being connected to said modulating means by at least one of said light activated switches, whereby the applied control voltage on said modulating means may be controllably synthesized by transferring charge to and from said capacitive voltage storing elements by means of said light activated switches operating in response to said optical input control signals whereby the modulation of said optical output may be arbitrarily controlled.

5. The optical-to-optical modulator according to claim 2, wherein said optical input control signal comprises a plurality of optical control signals and wherein each of said light activated switches is optically connected to at least two of said optical input control signals.

6. The optical-to-optical modulator according to claim 5, wherein said changing means further comprises a plurality of voltage sources, each of said voltage sources being connectable to one of said capacitive voltage storage elements, and wherein said capacitive voltage storage elements are connected to said modulating means by at least one of said light activated switches, whereby said applied control voltage may be selectively synthesized by transferring charge to and from said capacitive voltage storage elements by means of said light activated switches operating in response to said optical input control signals whereby the modulation of said optical output may be arbitrarily controlled.

7. The optical-to-optical modulator according to claim 2, wherein at least one of said light activated switches is mounted on a substrate and wherein said substrate comprises at least a part of the light path for transmitting said optical control signal to at least one of said light activated switch.

8. The optical-to-optical modulator according to claim 1, wherein said at least one light activated switch is selected from the group comprising bulk or junction devices.

9. The optical-to-optical modulator according to claim 1, wherein said at least one light activated switch has a linear photoconductive characteristic.

10. The optical-to-optical modulator according to claim 1, wherein said at least one light activated switch has a non-linear photoconductive characteristic.

11. The optical-to-optical modulator according to claim 10, wherein said at least one light activated switch is selected from the group comprising avalanche or lock-on devices.

12. The optical-to-optical modulator according to claim 1, wherein said modulating means is operable to modulate the amplitude of the optical energy passing therethrough.

13. The optical-to-optical modulator according to claim 1, wherein said modulating means is operable to modulate the phase of the optical energy passing therethrough.

14. The optical-to-optical modulator according to claim 1, wherein said modulating means is operable to modulate the polarization of the optical energy passing therethrough.

15. The optical-to-optical modulator according to claim 1, wherein said modulating means comprises a Pockels cell.

16. The optical-to-optical modulator according to claim 1, wherein said modulating means comprises a Kerr cell.

17. The optical-to-optical modulator according to claim 1, wherein said modulating means comprises an electro-optic deflector.

18. The optical-to-optical modulator according to claim 1, wherein said modulating means comprises an electro-optic lens.

19. The optical-to-optical modulator according to claim 1, wherein said modulating means is positioned within a Fabry-Perot resonator.

20. The optical-to-optical modulator according to claim 1, wherein said charge transfer circuit comprises at least one capacitive charge storage element and said changing means further comprises at least one variable voltage source connected to said capacitive charge storage element for variably charging said capacitive charge storage element to thereby control the applied control voltage.

21. The optical-to-optical modulator according to claim 1, wherein said changing means, including said at least one light activated switch and said modulating means are in the form of an integrated circuit.

22. The optical-to-optical modulator according to claim 1, wherein said modulating means is formed in sections, each of said sections being connected to said changing means to independently modulate the optical energy passing therethrough.

23. The optical-to-optical modulator according to claim 22, wherein said changing means further comprises a switch means positioned between said sections for selectively connecting said sections to said changing means.

24. The optical-to-optical modulator according to claim 1, further comprises a feedback control loop and wherein said optical control signal comprises a signal derived from light which has passed through said modulating means and connected to said changing means by said feedback control loop.

25. The optical-to-optical modulator according to claim 24, further comprising a second modulating means for modulating optical energy positioned in said feedback control loop for modulating the optical energy therein.

26. The optical-to-optical modulator according to claim 1, wherein said control means further comprises a feedforward control loop and wherein said optical control signal comprises a signal derived from light which is to be passed through said modulating means and connected to said changing means by said feed forward control loop.

27. The optical-to-optical modulator according to claim 26, further comprising a second modulating means for modulating optical energy positioned in said feedforward control loop for modulating the optical energy therein.

28. The optical-to-optical modulator according to claim 1, further comprising a transmission line, impedance matched to said modulating means and electrically connected to said modulating means by a light activated switch, said transmission line being operable for removing voltage from said modulating means.

29. The optical-to-optical modulator according to claim 28, wherein said transmission line is terminated by a matched impedance load whereby there is no reflection of said control voltage to said modulating means.

30. The optical-to-optical modulator according to claim 28, wherein said transmission line is sufficiently long that the reflection of said controlling voltage arrives back at said modulating means at a time sufficiently retarded so as not to affect the modulation of said optical energy during a time frame of interest.

31. A lasing system having a lasing axis and an optical-to-optical modulator disposed within said lasing system and positioned along said lasing axis, said optical-to-optical modulator comprising:
 a source of optical energy;
 modulating means comprising a capacitive electro-optic material which is responsive to an applied control voltage for modulating optical energy within said lasing system to generate a modulated optical output;
 changing means comprising at least one light activated switch operating in the charge transfer mode and optically connected to an applied optical control signal and at least one capacitive voltage storing element for changing said applied control voltage; and
 said modulating means being connected to said voltage storing element by said light activated switch whereby said optical control signal control said changing means to selectively vary the applied control voltage to said modulating means.

32. The lasing system according to claim 31, wherein said lasing system comprises a pair of light reflecting elements and further includes a laser cavity disposed between said light reflecting elements, and wherein said optical control signal comprises optical input energy taken from within said laser cavity.

33. The lasing system according to claim 31, further comprising a polarizer disposed along said lasing axis and wherein said optical input control signal comprises optical energy taken from said polarizer.

34. The lasing system according to claim 31, further comprising a pair of light reflecting elements and wherein said lasing system includes a laser cavity disposed between said light reflecting elements, and wherein said optical input control signal comprises optical energy taken from a source external to said laser cavity.

35. The lasing system according to claim 31, further comprising a pair of light reflecting elements and wherein said lasing system further comprises a laser cavity disposed between said light reflecting elements and wherein said optical control signal comprises optical input energy taken from an output of said laser cavity.

36. The lasing system according to claim 31, wherein said optical input control signal comprises optical energy from a plurality of sources.

37. The lasing system according to claim 36, further comprising a pair of light reflecting elements and wherein said lasing system further comprises a laser cavity disposed between said light reflecting elements in which said modulating means is disposed and wherein said plurality of sources comprises at least one source of optical energy from within said laser cavity and at least one source of optical energy external to said laser cavity.

38. The lasing system according to claim 31, wherein said at least one light activated switch is selected from the group comprising bulk or junction devices.

39. The lasing system according to claim 31, wherein said at least one light activated switch has a linear photoconductive characteristic.

40. The lasing system according to claim 31, wherein said at least one light activated switch has a non-linear photoconductive characteristic.

41. The lasing system according to claim 40, wherein said at least one light activated switch is selected from the group comprising avalanche or lock-on devices.

42. The lasing system according to claim 31, wherein said modulating means is operable to modulate the amplitude of the optical energy passing therethrough.

43. The lasing system according to claim 31, wherein said modulating means is operable to modulate the phase of the optical energy passing therethrough.

44. The lasing system according to claim 31, wherein said modulating means is operable to modulate the polarization of the optical energy passing therethrough.

45. The lasing system according to claim 31, wherein said modulating means comprises a Pockels cell.

46. The lasing system according to claim 31, wherein said modulating means comprises a Kerr cell.

47. The lasing system according to claim 31, wherein said modulating means is positioned within a Fabry-Perot resonator.

48. The lasing system according to claim 31, wherein said modulating means comprises an electro-optic lens.

49. The lasing system according to claim 31, wherein said modulating means comprises an electro-optic beam deflector.

50. The lasing system according to claim 31, wherein said at least one light activated switch comprises a plurality of light activated switches, and said optical input control signal comprises a plurality of optical control signals, each of said light activated switches being responsive to a respective one of said optical control signals.

51. The lasing system according to claim 50, wherein said changing means comprises at least two capacitive voltage storage elements and a light activated switch for controlling each of said capacitive voltage storage elements, whereby the applied control voltage on said modulating means is synthesized from the charge on said at least two capacitive voltage storage elements by controlling said light activated switches by means of said optical input control signal to thereby arbitrarily control the modulated optical output.

52. The lasing system according to claim 31, wherein said capacitive voltage storing element includes a dielectric layer modulated on a substrate and wherein said dielectric layer and said substrate comprise at least a portion of the light path for transmitting said optical input control signal to said at least one light activated switch.

53. The lasing system according to claim 31, wherein said optical input control signal comprises a plurality of optical input control signals and wherein said at least one light activated switch is positioned to control said at least one capacitive voltage storage element, said at least one light activated switch being operable for receiving at least one of said plurality of optical input control signals.

54. The lasing system according to claim 53, wherein said changing means comprises a plurality of capacitive voltage storage elements and a plurality of light activated switches for controlling said capacitive voltage storage elements, each of said voltage storage elements being connected to vary the applied control voltage across said modulating means and being controlled by at least one of said light activated switches, whereby said applied control voltage is synthesized by application of said optical control signals to said light activated switches to arbitrarily control the modulation of the output of said modulating means.

55. The lasing system according to claim 31, further comprising at least one variable voltage source connected to said at least one capacitive voltage storage element.

56. The lasing system according to claim 31, wherein said changing means, including said at least one light activated switch and said modulating means form integrated circuit.

57. The lasing system according to claim 31, further comprising a laser cavity in which said modulating means is disposed, and wherein said changing means is operable to modulate said applied control voltage so that a resonance of said lasing system is increased to a first value of Q.

58. The lasing system according to claim 57, wherein said changing means is further operable for modulating said applied control voltage by modulating said value of Q a predetermined time after said Q is increased to said first value, whereby said resonance is decreased to a second value of Q and then increased to a third value of Q in a time period which is short in comparison to the transit time of optical energy in the laser cavity.

59. The lasing system according to claim 58, wherein said changing means is operable for further modulating said value of Q in a time interval less than the transit time of optical energy in the laser cavity to produce a controlled output pulse from said modulating means.

60. The lasing system according to claim 57, wherein said changing means further comprises means for modulating said applied control voltage wherein a predetermined time after the lasing system resonance is increased to said first value of Q, said resonance is decreased to a second value of Q in a time period which is short in comparison to the transit time of optical energy in the laser cavity.

61. The lasing system according to claim 57, further comprising means for feeding pulses of light back from an output of said lasing system to said at least one light activated switch for causing said lasing system to mode-lock to the frequency of said pulses.

62. The lasing system according to claim 61, wherein changing means further comprise means for modulating said applied control voltage whereby at a time after said lasing system mode-locks, said resonance is decreased to a second value of Q and then increased to a third value of Q in a time period which is short in comparison to the transit time of optical energy in the laser cavity.

63. The lasing system according to claim 61, wherein said changing means further include means for modulating said applied control voltage whereby at a time after said lasing system mode-locks, said resonance is decreased to a second value of Q in a time period which is short in comparison to the transit time of the optical energy in the laser cavity.

64. The lasing system according to claim 61, wherein said at least one light activated switch is a short carrier lifetime switch, and wherein said changing means further comprises a second light activated switch having a carrier lifetime longer than the carrier lifetimes of said first-mentioned light activated switch.

65. The lasing system according to claim 64, wherein said second light activated switch is responsive to a signal selected from the group comprising: at least a portion of a signal fed back from an output of said lasing system; optical energy from within said laser cavity; and a source of optical energy external to said laser cavity.

66. The lasing system according to claim 31, further comprising a laser cavity in which said modulating means is disposed and wherein said changing means is operable to modulate said applied control voltage to cause said lasing system to mode-lock to the frequency of the applied control voltage.

67. The lasing system according to claim 66, wherein said changing means further includes means for modulating said applied control voltage whereby at a time after said lasing system mode-locks, the resonance of said lasing system is decreased from a first value of Q to a second lower value of Q and then increased to a third value of Q in a time period which is short in comparison to the transit time of optical energy in the laser cavity.

68. The lasing system according to claim 67, wherein said changing means is operable for further modulating said value of Q in a time interval less than the transit time of the optical energy in the laser cavity to produce a controlled output pulse from said modulating means.

69. The lasing system according to claim 66, wherein said changing means further includes means for modulating said applied control voltage whereby at a time after said lasing system mode-locks, said resonance is decreased from a first value of Q to a second lower value of Q in a time period which is short in comparison to the transit time of the optical energy in the laser cavity.

70. The lasing system according to claim 31, further comprising a laser cavity within which said modulating means is disposed and further comprising a feedback loop for feeding pulses of light from an output of said laser cavity to said at least one light activated switch for causing said lasing system to mode-lock to the frequency of said pulses.

71. The lasing system according to claim 70, wherein said feedback loop further comprises a second modulating means for modulating optical energy passing therethrough.

72. The lasing system according to claim 70, wherein said at least one light activated switch comprises a first, short-carrier-lifetime light activated switch, and further comprises a second light activated switch having a carrier lifetime longer than the carrier lifetime of said first-mentioned light activated switch.

73. The lasing system according to claim 72, wherein said second light activated switch is responsive to a signal selected from the group comprising: a signal fed back from an output of said laser cavity; optical energy from within the laser cavity; and a source of optical energy external to said laser cavity.

74. The lasing system according to claim 70, wherein said changing means further comprises means for modulating said applied control voltage to decrease a resonance of the lasing system from a first value of Q to a second value of Q and then to increase said resonance to a third value of Q in a time short compared to the transit time of the optical energy within the laser cavity whereby the lasing system produces a controlled output signal.

75. The lasing system according to claim 70, further comprising a laser cavity in which said modulating means is disposed and wherein said changing means further comprises means for modulating said applied control voltage to decrease a resonance of the lasing system from a first value of Q to a second value of Q in a time short compared to the transit time of the optical energy within the laser cavity whereby the optical energy within the laser cavity is cavity dumped.

76. The lasing system according to claim 31, further comprising a laser cavity in which said modulator is disposed and wherein said changing means further comprises means for modulating said applied control voltage to decrease the resonance of the lasing system from a first value of Q to a second value of Q and then to increase said resonance to a third value of Q in a time period which is short in comparison to the transit time of the optical energy within the laser cavity whereby the lasing system produces a controlled output signal.

77. The lasing system according to claim 31, further comprising a laser cavity in which said modulator is disposed and wherein said changing means further comprises means for modulating said applied control voltage to decrease a resonance of the lasing system from a first value of Q to a second value of Q in a time short compared to the transit time of the optical energy within the laser cavity whereby the optical energy within the laser cavity is cavity dumped.

78. The lasing system according to claim 31, further comprising a pair of light reflecting elements and a laser cavity disposed between said light reflecting elements in which said modulating means is disposed, and wherein said at least one light activated switch comprises a plurality of light activated switches and wherein at least one of said light activated switches is optically connected to an optical source external to said laser cavity and at least one of said light activated switches is optically connected to an optical source within said laser cavity.

79. The lasing system according to claim 78, further comprising a second modulating means for modulating optical energy, said second modulating means being positioned to modulate the light input to at least one of said plurality of light activated switches.

80. The lasing system according to claim 31, further comprising a laser cavity in which said modulating means is disposed and wherein said at least one light activated switch comprises a plurality of light activated switches wherein at least one of said light activated switches is optically connected to an optical source external to said laser cavity and at least one of said light activated switches is optically connected to an output of said laser cavity.

81. The lasing system according to claim 31, further comprising a laser cavity in which said modulating means is disposed and wherein said at least one light activated switch comprises a plurality of light activated switches wherein at least one of said light activated switches is optically connected to an optical source external to said laser cavity and at least a second of said light activated switches is optically connected to said external optical source by means of a delay element having a predetermined time delay.

82. The lasing system according to claim 31, wherein said modulating means includes means for modulating a plurality of beams of optical energy.

83. The lasing system according to claim 82, wherein said modulating means include means to individually modulate each of said plurality of beams.

84. The lasing system according to claim 82, wherein said modulating means modulates said plurality of beams in accordance with said applied control voltage.

85. The lasing system of claim 31, wherein said modulating means is formed in sections, each of said sections being connected to independently modulate a beam of light.

86. The lasing system of claim 85, further comprising a switch means positioned between said sections for selectively connecting one of said sections to another of said sections.

87. A laser system, comprising:
a source of optical energy;
a laser cavity having a lasing axis along which optical energy is directed and containing therein a laser medium;
modulating means, disposed in said laser cavity along said lasing axis, said modulating means comprising material which is responsive to an applied control voltage for modulating a characteristic of said optical energy, said applied control voltage creating an applied field within said modulating means;
means for applying said control voltage to said modulating means to create said applied field, said applying means comprising at least one capacitive voltage storing element and at least one light activated switch operating in the charge transfer mode and responsive to an optical input control signal for varying said applied control voltage, wherein a characteristic of the optical energy output from said laser system is modulated in accordance with the applied control voltage and the optical input control signal.

88. The laser system according to claim 87, wherein said applying means comprises at least two light activated switches, a first of said light activated switches being optically connected to a first optical input control signal, and a second of said light activated switches being optically connected to a second optical input control signal, wherein each of said first and second light activated switches, when closed by its respective optical input control signal, change said applied control voltage.

89. The laser system according to claim 88, wherein said first and second switches each comprise linear photoconductive switches.

90. The laser system according to claim 88, wherein the second optical input control signal is derived from optical energy within said laser cavity.

91. The laser system according to claim 88, wherein the second optical input control signal is derived from an output of said laser cavity.

92. The laser system according to claim 88, further comprising a polarizer disposed along said lasing axis and wherein a second optical input control signal is derived from light from said polarizer.

93. The laser system according to claim 88, wherein said second optical input control signal is derived from said first optical input control signal delayed by a predetermined time period.

94. The laser system according to claim 87, wherein said at least one light activated switch comprises at least one non-linear photoconductive switch.

95. The laser system according to claim 87, wherein said modulating means comprises an electro-optic device and said applied field comprises an electric field.

96. The laser system according to claim 87, wherein said laser cavity produces an output and further comprising means for supplying a portion of the optical energy from within the laser cavity to said applying means to thereby increase the energy of said output, thereby causing more energy to be fed to said applying means, whereby said laser system is caused to change from a high resonance state to a low resonance state.

97. The laser system according to claim 87, wherein said applying means is operable to modulate said applied control voltage whereby the laser cavity resonance is increased to a first value of Q then, after a predetermined time interval, decreased to a second value of Q and, after a second predetermined time interval, increased to a third value of Q, said time intervals being short in comparison to the transit time of the light in said laser cavity whereby said laser cavity produces a controlled output signal.

98. The laser system according to claim 87, wherein said laser cavity has a cavity resonance Q and wherein said at least one light activated switch is operable to modulate said applied control voltage to increase the value of Q to a first value and thereafter a predetermined time later to decrease said cavity resonance to a second value of Q in a time which is short in comparison to the transit time of optical energy within said laser cavity.

99. The laser system according to claim 87, wherein said modulating means is formed in at least two sections, each of said sections being connected to independently modulate a beam of light.

100. The laser system according to claim 99, further comprising a switch positioned between said sections for selectively connecting said sections to said applying means.

101. The laser system according to claim 87, wherein said laser system produces a first predetermined wavelength of light, the laser system further comprising nonlinear optical means for converting said first predetermined wavelength to a second predetermined wavelength of light, such that said second wavelength is one half of said first wavelength.

102. The laser system according to claim 101, further comprising nonlinear optical means for converting either said first or said second wavelength of light to produce light having a third predetermined wavelength.

103. The laser system according to claim 87, wherein said laser system produces a first predetermined wavelength of light, the laser system further comprising nonlinear optical means for converting said first wavelength of light to a second wavelength and third wavelength, such that the sum of the frequencies of said second and third wavelengths is equal to the frequency of said first wavelength.

104. The laser system according to claim 87, wherein said at least one light activated switch comprises at least two light activated switches and further comprising a feedback loop, wherein at least a portion of the light emitted from said laser cavity is fed back by said feedback loop to control a first of said at least two light activated switches, said first switch having a short carrier lifetime whereby said laser is caused to mode-lock.

105. The laser system according to claim 104 further comprising a second light activated switch connected in parallel with said first light activated switch, said second switch having a carrier lifetime which is slow relative to said first light activated switch, said second light activated switch being connected whereby when illuminated to cause said laser system to cavity dump or to produce a controlled output signal.

106. The laser system according to claim 105, wherein said second light activated switch is controlled by an optical input signal selected from the group comprising: a signal fed back from an output of the laser cavity; optical energy from within said laser cavity; and a source of optical energy external to said laser cavity.

107. The laser system according to claim 87, further comprising a second laser system having means for modulating a characteristic of the optical energy passing therethrough, and wherein the output of said first mentioned laser system is used as an optical input control signal for said second laser system.

108. A method of controlling an optical-to-optical modulator, said optical-to-optical modulator including at least one capacitive voltage storage element formed from an electro-optic material and responsive to an applied control voltage to modulate optical energy passing therethrough, and at least one light activated switch operating in the charge transfer mode and responsive to an optical input control signal, said method comprising the steps of:
  passing optical energy through said optical-to-optical modulator;
  controlling the applied control voltage across said optical-to-optical modulator by means of said optical input control signal in order to selectively vary said applied control voltage;
  modulating the optical energy passing through said optical-to-optical modulator based on said applied control voltage.

109. The method according to claim 108, wherein said at least one light activated switch includes a switch connected in shunt across said at least one capacitive voltage storing element, and further comprising the step of changing said applied control voltage by means of said shunting switch.

110. The method according to claim 108, wherein said at least one light activated switch includes a first switch connected in series between said at least one capacitive voltage storage element and a further capacitive voltage storage element and responsive to a first optical control signal, and further comprising the step of changing said applied control voltage by transferring charge to and from said capacitive voltage storage elements by means of said first optical control signal.

111. The method according to claim 110, wherein said at least one light activated switch further comprises a second switch connected in shunt across said at least one capacitive voltage storage element and responsive to a second optical control signal and further comprising the step of changing the applied control voltage by application of said first and second optical control signals to said first and second switches.

112. The method according to claim 108, wherein said step of modulating comprises the step of modulating the amplitude of said optical energy passing through said modulator.

113. The method according to claim 108, wherein said step of modulating comprises the step of modulating the phase of said optical energy passing through said modulator.

114. The method according to claim 108, wherein said step of modulating comprises the step of modulating the polarization of said optical energy passing through said modulator.

115. The method according to claim 108, wherein said optical-to-optical modulator includes at least one additional capacitive voltage storing element, and wherein said capacitive voltage storage elements are controlled by at least two light activated switches, each of said light activated switches being responsive to an optical input control signal, and wherein said step of controlling said applied controlling voltage further comprises the step of selectively controlling each of said light activated switches by means of a respective optical input control signal.

116. The method according to claim 115, wherein said step of controlling further comprises the step of selectively controlling the charge on said at least one capacitive voltage storage elements to thereby vary the applied control voltage.

117. The method according to claim 116, further comprising the step of selectively controlling the charge on at least one of said capacitive voltage storage elements by means of a variable voltage source.

118. The method according to claim 108, wherein said optical-to-optical modulator comprises at least two sections and said method further comprises the step of independently modulating the optical energy passing through each of said at least two sections.

119. The method according to claim 108, wherein said modulator is disposed within an optical cavity and further comprising the steps of deriving a feedback signal from at least a portion of the optical energy which has passed through said modulator and using said feedback signal for at least a portion of said optical input signal.

120. The method according to claim 119, further comprising the step of modulating said feedback signal.

121. The method according to claim 108, wherein said modulator is disposed within an optical cavity and further comprising the step of deriving a feedforward signal based on a portion of the light to be passed through the modulator and using said feedforward signal to form at least a portion of said optical input signal.

122. The method according to claim 121, further comprising the step of modulating said feedforward signal.

123. A method for generating a modulated optical output using an optical-to-optical modulator disposed within a lasing system having a lasing axis and positioned along said lasing axis, said modulator including at least one capacitive voltage storage element formed of an electro-optic material and responsive to an applied control voltage for modulating optical energy passing therethrough and at least one charge transfer, light activated switch connected to the capacitive voltage storage element and responsive to an optical control signal, said method comprising the steps of:

passing optical energy along said lasing axis through said modulator;

generating an applied control voltage using said at least one capacitive voltage storage elements and said at least one light activated switch;

controlling said applied control voltage by means of said optical control signal to thereby selectively vary said applied control voltage by charge transfer through said at least one light activated switch;

whereby a characteristic of the optical energy passing along said lasing axis is modulated to generate an optical output modulated in accordance with the applied control voltage.

124. The method according to claim 123, wherein said at least one light activated switch includes a switch connected in shunt across said at least one capacitive voltage storing element and further comprising the steps of impressing an applied control voltage on said modulator and selectively changing said applied control voltage by means of said optical control signal.

125. The method according to claim 123, wherein said at least one light activated switch includes a first switch connected in series between said at least one capacitive voltage storage element and a further capacitive voltage storage element charged to a first voltage, said first switch being responsive to a first optical control signal, and wherein the step of controlling further comprises the step of transferring charge between said capacitive voltage storing elements via said first switch in response to said first optical control signal.

126. The method according to claim 125, wherein said at least one light activated switch further comprises a second switch, responsive to a second optical control signal and connected in shunt across said at least one capacitive voltage storage element and wherein the step of controlling further comprises selectively transferring charge to and away from said at least one capacitive voltage storage element by means of said first and second switches in response to said first and second optical control signals, respectively.

127. The method according to claim 123, wherein said lasing system further includes a laser cavity and said step of controlling further comprises the step of using light from within said laser cavity as at least a portion of the optical control signal.

128. The method according to claim 123, wherein said lasing system further comprises a polarizer disposed along said lasing axis and said step of controlling the applied control voltage further comprises the step of using light from said polarizer as at least a portion of the optical control signal.

129. The method according to claim 123, wherein said lasing system further comprises a laser cavity and said step of controlling the applied control voltage further comprises the step of using light external to said laser cavity as at least a portion of said optical control signal.

130. The method according to claim 129, wherein said step of using light external to said laser cavity comprises the step of using light from an external light source as at least a portion of said optical control signal.

131. The method according to claim 129, wherein said step of using light external to said cavity comprises the step of using light from an output of said lasing system as at least a portion of said optical control signal.

132. The method according to claim 123, wherein said lasing system further includes a laser cavity and the step of controlling the applied control voltage further comprises the step of using light from a plurality of sources as said optical control signal, said sources comprising at least one source within said laser cavity and at least one source external to said laser cavity.

133. The method according to claim 123, wherein the characteristic being modulated comprises the amplitude of said optical energy within said lasing system.

134. The method according to claim 123, wherein the characteristic being modulated comprises the phase of the optical energy within said lasing system.

135. The method according to claim 123, wherein the characteristic being modulated comprises the polarization of the optical energy within said lasing system.

136. The method according to claim 123, wherein said at least one capacitive voltage storage element is connected to a plurality of light activated switches, each of said light activated switches being responsive to an optical control signal, and wherein said step of controlling the applied control voltage further comprises the step of selectively controlling said plurality of light activated switches by means of said optical control signals.

137. The method according to claim 123, wherein said at least one capacitive voltage storage element is connected to a plurality of light activated switches and a plurality of further capacitive voltage storing elements, each of said further capacitive voltage storing elements being separated from an adjacent element by one of said light activated switches, and wherein the step of controlling the applied control voltage further comprises the step of selectively controlling said light activated switches by means of said optical control signals to thereby controllably modulate said characteristic of the light energy passing through said modulator.

138. The method according to claim 137, further comprising at least one voltage source connected to said at least one of said further capacitive voltage storage elements, wherein the step of controlling the applied control voltage further comprises varying said variable voltage source to control said applied control voltage.

139. The method according to claim 123, wherein said lasing system further includes a laser cavity having a resonance value Q, and wherein said step of controlling the applied control voltage comprises the step of modulating said applied control voltage to increase the value of Q to a first value.

140. The method according to claim 139, wherein said step of controlling the applied control voltage further comprises the step of further modulating the applied control voltage at a predetermined time after the value of Q is increased to said first value, to decrease the value of Q to a second value, and to then increase the value of Q to a third value, said modulating being done in a time interval which is short in comparison to the transit time of the optical energy in the laser cavity whereby the lasing system produces a controlled output signal.

141. The method according to claim 139, wherein said step of controlling the applied control voltage further comprises the step of further modulating the applied control voltage at a predetermined time after the value of Q is increased to said first value to decrease the value of Q to a second value in a time short in comparison to the transit time of the optical energy in the laser cavity whereby the optical energy within the laser cavity is cavity dumped.

142. The method according to claim 139, wherein said step of controlling the applied control voltage further comprises the step of feeding back, in the form of pulses, at least a portion of pulsed energy light from an output of said lasing system as at least a portion of the optical control signal to said at least one light activated switch for causing said lasing system to mode-lock to the frequency of said pulses.

143. The method according to claim 142, wherein said step of controlling the applied control voltage further comprises the step of further modulating said applied control voltage at a time after said lasing system mode-locks to decrease the value of Q to a second value and to thereafter increase the value of Q to a third value, said further modulating being done in a time interval short in comparison to the transit time of the optical energy in the laser cavity whereby the lasing system produces a controlled output signal.

144. The method according to claim 142, wherein said step of controlling the applied control voltage further comprises the step of modulating said applied control voltage at a time after said lasing system mode-locks so that the value of Q is decreased to a second value in a time interval short in comparison to the transit time of the optical energy in the laser cavity whereby the optical energy within the laser cavity is cavity dumped.

145. The method according to claim 144, wherein said at least one light activated switch comprises a first switch and said portion of the pulsed light energy fed back from the output of the lasing system comprises at least a portion of the control signal for said first switch, said first switch having a fast carrier lifetime whereby said pulsed light energy mode-locks the modulator to the frequency of the input signal.

146. The method according to claim 145, wherein said at least one light activated switch further comprises a second switch, said second switch being connected across said modulator in parallel with said first switch, said second switch having a carrier lifetime which is long relative to the carrier lifetime of said first switch, and further comprising the step of inputting a control signal to said second switch for cavity dumping said laser cavity and for producing a controlled output therefrom.

147. The method according to claim 139, wherein said step of controlling the applied control voltage further comprises the step of modulating the applied control voltage to cause said lasing system to mode-lock to the frequency of applied control voltage.

148. The method according to claim 147, wherein said step of controlling the applied control voltage further comprises the step of further modulating the applied control voltage at a time after said lasing system mode-locks to decrease the value of Q to a second value and to thereafter increase the value of Q to a third value, said further modulating being done in a time interval short in comparison to the transit time of the optical energy in the laser cavity whereby the lasing system produces a controlled output signal.

149. The method according to claim 147, wherein said step of controlling the applied control voltage further comprises the step of modulating the applied control voltage at a time after said lasing system mode-locks so that the value of Q is decreased to a second value in a time interval short in comparison to the transit time of the optical energy in the laser cavity whereby the optical energy within the laser cavity is cavity dumped.

150. The method according to claim 123, wherein said step of controlling the applied control voltage further comprises the step of feeding pulses of light derived from an output of said lasing system as at least a portion of the optical control signal to said at least one light activated switch to cause said lasing system to mode-lock to the frequency of said pulses.

151. The method according to claim 123, said lasing system further comprises a laser cavity having a resonance value Q and wherein said step of controlling the applied control voltage comprises the step of modulating said applied control voltage by means of an optical control signal from a source external to said laser cavity, whereby said lasing system is caused to mode-lock to the frequency of the modulated applied control voltage.

152. The method according to claim 151, wherein said step of controlling the applied control voltage comprises the step of further modulating said applied control voltage to decrease the value of Q to a first value and to thereafter increase the value of Q to a second value, said further modulating being done in a time interval short in comparison to the transit time of the optical energy in the laser cavity whereby the lasing system produces a controlled output signal.

153. The method according to claim 151, wherein said step of controlling the applied control voltage comprises the step of modulating the applied control voltage so that the value of Q is decreased to a first value of Q in a time interval short in comparison to the transit time of the optical energy in the laser cavity whereby the optical energy within the laser cavity is cavity dumped.

154. The method according to claim 123, wherein said lasing system further comprises laser cavity having a resonance value Q and said step of controlling the applied control voltage comprises the step of modulating said applied control voltage to decrease the value of Q of said lasing system and to thereafter increase the value of Q, said modulating being done in a time interval short in comparison to the transit time of the optical energy in the laser cavity whereby the lasing system produces a controlled output signal.

155. The method according to claim 123, wherein said lasing system further comprises laser cavity having a resonance value Q and said step of controlling the applied control voltage comprises the step to modulating said applied control voltage so that the value of Q is decreased to a first value in a time interval short in comparison to the transit time of the optical energy in the laser cavity whereby the optical energy within the laser cavity is cavity dumped.

156. The method according to claim 123, wherein said lasing system includes a laser cavity and said at least one light activated switch comprises a plurality of light activated switches and said step of controlling the applied control voltage further comprises the step of controlling at least one of said switches using light from a source external to said laser cavity as the optical control signal and controlling at least a second of said switches using light from within said laser cavity as the optical control signal.

157. The method according to claim 123, wherein said lasing system includes a laser cavity and said at least one light activated switch comprises a plurality of light activated switches and said step of controlling further comprises the step of controlling at least one of said switches using light from a source external to said laser cavity as the optical control signal and controlling at least a second one of said switches with light from an output of said lasing system as the optical control signal.

158. The method according to claim 123, wherein said lasing system includes a laser cavity and said at least one light activated switch comprises a plurality of light activated switches and said step of controlling comprises the step of controlling a first of said switches using a first optical control signal from a source external to said laser cavity and controlling a second of said switches using said first optical control signal delayed by a predetermined time delay.

159. The method according to claim 123, wherein said lasing system includes a laser cavity and wherein a plurality of beams of optical energy are modulated, at least one of said beams being external to the laser cavity.

160. The method according to claim 159, further comprising the step of further modulating the output of said lasing system.

161. The method according to claim 159, wherein said modulator comprises at least two sections, each having a beam of optical energy passing therethrough, and said method further comprises the step of independently controlling the modulation of the beam of optical energy passing through each of said at least two sections.

162. The method according to claim 159, further comprising the step of generating a plurality of applied control voltages, and further comprising the step of modulating each of said plurality of beams in accordance with a respective one of said plurality of applied control voltages.

163. The method according to claim 159, further comprising the step of modulating said plurality of beams in accordance with the applied control voltage on the optical-to-optical modulator.

* * * * *